(12) United States Patent
Carranza et al.

(10) Patent No.: US 10,049,469 B2
(45) Date of Patent: Aug. 14, 2018

(54) SYSTEM AND METHODS FOR COMPUTING FORWARD AND INVERSE DISCRETE PERIODIC RADON TRANSFORM

(71) Applicant: STC.UNM, Albuquerque, NM (US)

(72) Inventors: Cesar Carranza, Miami Beach, FL (US); Marios Stephanou Pattichis, Albuquerque, NM (US); Daniel Llamocca Obregon, Pontiac, MI (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/103,977

(22) PCT Filed: Dec. 15, 2014

(86) PCT No.: PCT/US2014/070371
§ 371 (c)(1),
(2) Date: Jun. 13, 2016

(87) PCT Pub. No.: WO2015/095064
PCT Pub. Date: Jun. 25, 2015

(65) Prior Publication Data
US 2016/0314603 A1    Oct. 27, 2016

Related U.S. Application Data

(60) Provisional application No. 61/968,613, filed on Mar. 21, 2014, provisional application No. 61/916,523, filed on Dec. 16, 2013.

(51) Int. Cl.
*G06T 11/00* (2006.01)
*G06F 17/14* (2006.01)
*G06K 9/00* (2006.01)

(52) U.S. Cl.
CPC ............ *G06T 11/006* (2013.01); *G06F 17/14* (2013.01); *G06F 17/141* (2013.01); *G06K 9/00973* (2013.01); *G06T 2211/428* (2013.01)

(58) Field of Classification Search
None
See application file for complete search history.

(56) References Cited

U.S. PATENT DOCUMENTS 6,332,035 B1    12/2001  Basu et al.
2008/0024667 A1  1/2008  Ajoika et al.
2009/0257102 A1 10/2009  Silverbrook et al.

OTHER PUBLICATIONS

Kim et al., "Hardware Acceleration of Iterative Image Reconstruction for X-ray Computed Tomography" In: 2011 IEEE International Conference, Acoustics, Speech and Signal Processing, Mat 22-27, 2011 [online][retreived on Mar. 1, 2015 (Mar. 1, 2015)] Retrieved from the Internet <URL:http://ieeexplore.ieee.org/xpl/login.jsp?tp=&,amnumber=5946827&url=%3A%2F%2Fieeexplore.ieee.org%2Fxpls%2Fabs_all.jsp%3Farnumber%3D5946827>.

(Continued)

*Primary Examiner* — Yi Wang
(74) *Attorney, Agent, or Firm* — Valauskas Corder LLC

(57) ABSTRACT

A fast and a scalable approach for computing the forward and inverse DPRT that uses: (i) a parallel array of fixed-point adder trees to compute the additions, (ii) circular shift registers to remove the need for accessing external memory components, (iii) an image block-based approach to DPRT computation that can fit the proposed architecture to available resources, and (iv) fast transpositions that are computed in one or a few clock cycles that do not depend on the size of the input image.

30 Claims, 22 Drawing Sheets

(56) References Cited

OTHER PUBLICATIONS

Svalbe et al., "Image Operations in Discrete Radon Space" In: Digital Image Computing Techniques and Applications, Jan. 21-22, 2002 [online][retrieved on Mar. 1, 2013 (Mar. 1, 2015)] Retrieved from the Internet <URL:http://staff.itee.uq.edu.au/lovell/aprs/dicta2002_proceedings/Svalbe285.pdf>.

Frederick et al. "Real-time H/W Implementation of the Approximate Discrete Radon Transform" In: 2005 IEEE International Conference, Application-Specific Systems, Architecture Processors, Jul. 23-25 [online][retrieved Mar. 1, 2015 (Mar. 1, 2015)] Retrieved from the Internet <<URL:http://dl.acm.org/citation.cfm?id=1097155>.

1: Load_shifted_image (f) in MEM_IN
    using CLS registers of SFDPRT_core.
2: for r = 0 to K - 1 do
3:     Load_strip (r, 'row_mode') into the SFDPRT_core
4:     for k = 0 to N - 1 do
5:         Shift in parallel all the H rows:
            $CLS_a(H \cdot r + a)$,
            $a = 0,..., H - 1$
6:         Compute in parallel $R'_{r,k}(d)$
7:         Add_partial_result: $R_k(d) = R_k(d) + R'_{r,k}(d)$
            in MEM_OUT
8:     end for
9: end for
10: for r = 0 to K - 1 do
11:     Load_strip (r,'column_mode') into the SFDPRT_core
12:     Shift in parallel all the H rows:
        $CLS_a(H \cdot r + a)$,
        $a = 0,..., H - 1$
13:     Compute in parallel $R'_{r,N}(d)$
14:     Add_partial_result: $R_N(d) = R_N(d)+R'_{r,N}(d)$
        in MEM_OUT
15: end for

FIG. 3

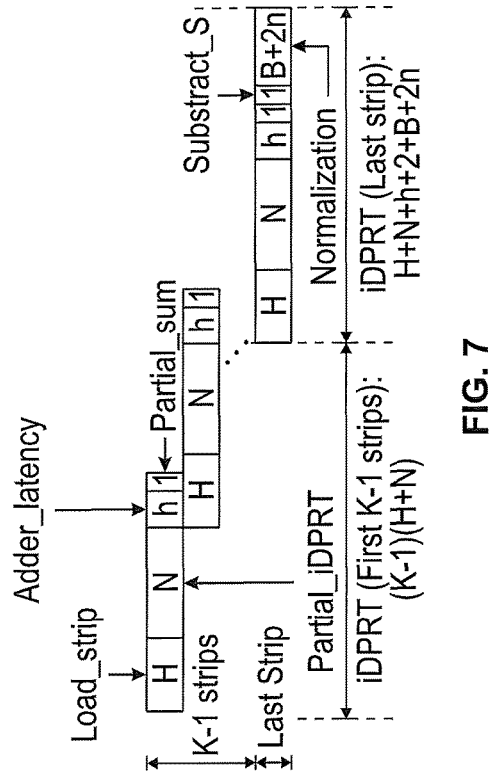

1: Load image f into MEM_IN
2: for z = 0 to K - 1 do
3:   for y = 0 to H - 1 do
4:     Move row (z * H + y) of f into SFDPRT_core in reverse-order (flipped)
5:     if z > 0 then
6:       Move the top row from SFDPRT_core to MEM_IN in reverse-order at ((z - 1) * H + y)
7:     end if
8:   end for
9:   Shift in parallel all the H rows into SFPRDT_core registers: CLS(z * H + a), a = 0,..., H - 1.
10: end for
11: for y = 0 to H - 1 do
12:   Move the top row from SFDPRT_core to MEM_IN in reverse-order at ((K - 1) * H + y)
13: end for

FIG. 10

1: for z = 0 to H - 1 do
2:   if M == 'row_mode' then
3:     Move MEM_IN row (r · H + z), mode M into SFDPRT_core.
4:   else
5:     Move MEM_IN row (r · H + z), mode M into SFDPRT_core in reverse-order (flipped).
6:   end if
7: end for

FIG. 11

1: Read accumulated $R_k(d)$ from MEM_OUT
2: If k = N then
3:   Flip $R'_k(d)$
4: end if
5: Add $R_k(d) = R_k(d) + R'_k(d)$
6: Store $R_k(d)$ in MEM_OUT

FIG. 12

```
1: procedure Tree_Resources(H, B)
2:     h = [log₂H]
3:     A_ff = A_FA = A_mux = 0
4:     a = H
5:     for z = 1 to h do
6:         r = ⟨a⟩₂
7:         a = [a/2]
8:         A_FA = A_FA + a · (B + z - 1)
9:         A_mux = A_mux + a · B
10:        a = a + r
11:        A_ff = A_ff + a · (B + z)
12:    end for
13:    return A_FA, A_ff, A_mux
14: end procedure
```

SYSTEM AND METHODS FOR COMPUTING FORWARD AND INVERSE DISCRETE PERIODIC RADON TRANSFORM

CROSS-REFERENCE TO RELATED APPLICATIONS

This application claims the benefit of U.S. Provisional Application No. 61/916,523 filed on Dec. 16, 2013, and U.S. Provisional Application No. 61/968,613 filed on Mar. 21, 2014, each of which are incorporated by reference in their respective entirety.

FIELD OF THE INVENTION

The invention relates generally to image processing. More specifically, the invention relates to image reconstruction using the Discrete Periodic Radon Transform (DPRT) and related computer hardware architecture.

BACKGROUND OF THE INVENTION

While a computer system is operating, resources are spent to manage various aspects of the system. Systems may be configured before operation to prioritize certain resources of the system over others. Other systems may include an embedded system that configures system resources. Embedded systems typically maintain a dedicated function within a larger mechanical, electrical or computer system, often with real-time computing constraints.

Embedded systems include, for example, hardware components such as programmable logic devices (PLDs). PLDs, including field-programmable gate arrays (FPGAs), are integrated circuits (ICs) that can be programmed to implement user-defined logic functions.

FPGAs are an important and commonly used circuit element in conventional electronic systems. FPGAs are attractive for use in many designs in view of their low non-recurring engineering costs and rapid time to market. FPGA circuitry is also being increasingly integrated within other circuitry to provide a desired amount of programmable logic. Many applications can be implemented using FPGA devices without the need of fabricating a custom integrated circuit.

The Discrete Radon Transform (DRT) is an essential component of a wide range of applications in image processing. Applications of the DRT include the classic application of reconstructing objects from projections such as in computed tomography, radar imaging and magnetic resonance imaging. More recently, the DRT has also been applied in image denoising, image restoration, texture analysis, line detection in images, and encryption.

A popular method for computing the DRT involves the use of the Fast Fourier Transform (FFT). First, the 2-D FFT is used for computing the 2-D FFT spectrum. Second, the 2-D FFT spectrum is sampled along different radial lines through the origin. Then, the 1-D inverse FFT is used for estimating the DRT. This direct approach based on the FFT suffers from many artifacts. Assuming that the DRT is computed directly, an exact inversion algorithm has been proposed including improvements related to the elimination of interpolation calculations. However, the DRT requires the use of expensive floating point units for implementing the FFTs. Floating point units require significantly larger amounts of hardware resources than fixed point implementations.

The Discrete Periodic Radon Transform (DPRT) has been extensively used in applications that involve image reconstructions from projections. Beyond classic applications, the DPRT can also be used to compute fast convolutions that avoid the use of floating-point arithmetic associated with the use of the Fast Fourier Transform. Unfortunately, the use of the DPRT has been limited by the need to compute a large number of additions and the need for a large number of memory accesses.

Fixed point implementations of the DRT can be based on the DPRT. Previous research as resulted in the introduction of the forward DPRT algorithm for computing the 2-D Discrete Fourier Transform as well as a sequential algorithm for computing the DPRT and its inverse for prime sized images.

Similar to the continuous-space Radon Transform, the DPRT satisfies discrete and periodic versions of the Fourier slice theorem and the convolution property. Thus, the DPRT can lead to efficient, fixed-point arithmetic methods for computing circular and linear convolutions. The discrete version of the Fourier slice theorem provides a method for computing 2-D Discrete Fourier Transforms based on the DPRT and a minimal number of 1-D FFTs.

Scalable solutions for embedded systems are desired that can deliver different solutions based on one or more constraints. As an example, it is desirable to have a low-energy solution when there is a requirement for long-time operation and a high-performance solution when there is no power (or energy) constraint. More specifically, scalable solutions are desired that can allocate hardware resources based on constraints, for example minimize energy consumption, minimize bitrate requirements, increase accuracy, increase performance, and/or improve image quality.

There is a demand for DPRT algorithms that are both fast—the computation provides the result in the minimum number of cycles—and scalable—the approach provides the fastest implementation based on the amount of available resources. The invention satisfies this demand.

SUMMARY OF THE INVENTION

The invention introduces a fast and scalable approach for computing the forward and inverse DPRT that is based on parallel shift and add operations. As demonstrated in an FPGA implementation, for a wide range of computational resources, the invention provides the fastest possible computation of the DPRT. For purposes of this application, the term "SFDPRT" refers to scalable and fast Discrete Periodic Radon Transform, "iSFDPRT" refers to the inverse scalable and fast Discrete Periodic Radon Transform, "FDPRT" refers fast Discrete Periodic Radon Transform, and "iFDPRT" refers to the inverse fast Discrete Periodic Radon Transform.

Specifically, the invention introduces a fast and scalable approach for computing the forward and inverse DPRT that uses: (i) a parallel array of fixed-point adder trees to compute the additions, (ii) circular shift registers to remove the need for accessing external memory components, (iii) an image block-based approach to DPRT computation that can fit the proposed architecture to available resources, and (iv) fast transpositions that are computed in one or a few clock cycles that do not depend on the size of the input image. Compared to previous approaches, the scalable approach provides the fastest known implementations for different amounts of computational resources.

One advantage of the invention is that fast and scalable DPRT approaches lead to algorithms and architectures that are optimal in the multi-objective sense. As an example, the invention may be connected to integrated circuits and dynamic management of hardware resources in an embedded system via multi-objective optimization as described in U.S. patent application Ser. No. 14/069,822 filed on Nov. 11, 2013, which is incorporated by reference in its entirety.

Another advantage of the invention is that the fast and scalable architecture can be adapted to available resources. The invention is scalable, allowing application to larger images with limited computational resources. For example, the required hardware resources can be reduced so that the architecture fits in smaller devices while sacrificing speed. Alternatively, larger devices can provide faster implementations while possibly requiring more resources. Specifically, the invention is designed to be fast in the sense that column sums are computed on every clock cycle. In the fastest implementation, a prime direction is computed on every clock cycle.

Another advantage of the invention is that it is Pareto-optimal in terms of the required cycles and required resources. Thus, the invention provides the fastest known implementations for the given computational resources. As an example, in the fastest case, for an N×N image (N prime), the DPRT is computed in linear time ($6N+\lceil \log_2 N \rceil+3$ clock cycles) requiring resources that grow quadratically ($O(N^2)$). In the most limited resources case, the running time is quadratic ($\lceil N/2 \rceil(N+8)+N+4$ clock cycles) requiring resources that grow linearly ($O(N)$). A Pareto-front of optimal solutions is given for resources that fall within these two extreme cases. Furthermore, when sharing comparable computational resources, the invention is better than previous approaches.

For the fastest case, the scalable architecture can be reduced to obtain the FDPRT in $2N+\lceil \log_2 N \rceil+1$ and iFDPRT in $2N+3\lceil \log_2 N \rceil+B+2$ cycles with B being the number of bits used to represent each input pixel.

Another advantage of the invention provides parallel and pipelined implementation that provides an improvement over sequential algorithms. The invention computes N×H additions in a single clock cycle. Furthermore, shift registers are used to make data available to the adders in every clock cycle. Then, additions and shifts are performed in parallel in the same clock cycle. To keep the flow of the addition data at high speed, the use of RAMs may be suppressed in favor of using shift registers to provide the data to every adder per clock cycle. Furthermore, in the same clock cycle, addition and shifting can be performed simultaneously.

Another advantage of the invention is that fast transpositions are based on parallel Random Access Memory (RAM) access. A unique RAM architecture and associated algorithm provides a complete row or column of the input image in one clock cycle. Using this architecture, transposition is avoided since the image can be accessed by either rows or columns.

In certain embodiments of the invention, the usage of RAMs is eliminated, the complete image is loaded in registers and the DPRT is computed thereby eliminating the constraint of how much data can be transferred to the adders per clock cycle. In other embodiments, RAMs may be used as a buffer to hold the complete input image and the output DPRT. The invention provides an architecture and associated algorithm that can provide a complete row or column of the input image in one clock cycle (i.e. a throughput of N pixels per clock cycle), and without increasing the amount of RAM required to hold the complete image.

Another advantage of the invention is that the architectures are not tied to any particular hardware. They can be applied to any existing hardware (e.g., FPGA or VLSI) since they are developed in VHDL and are fully parameterized for any prime N.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 3 illustrates an algorithm for processing the SFDPRT according to one embodiment of the invention.

FIG. 6 illustrates an algorithm for processing the iSFDPRT according to one embodiment of the invention.

FIG. 7 illustrates a diagram of the running time for iSFDPRT according to one embodiment of the invention.

FIG. 8 illustrates an algorithm for processing the inverse fast Discrete Periodic Radon Transform (iFDPRT) according to one embodiment of the invention.

FIG. 10 illustrates an algorithm for shifting the input image during loading according to one embodiment of the invention.

FIG. 11 illustrates an algorithm for loading the strips of the input image according to one embodiment of the invention.

FIG. 12 illustrates an algorithm for accumulating the partial DPRT results computed for each strip according to one embodiment of the invention.

DETAILED DESCRIPTION OF THE INVENTION

The invention is directed to a scalable approach providing the fastest known implementations for different amounts of computational resources for computing the forward and inverse Discrete Periodic Radon Transform (DPRT). According to the invention, for a N×N image (N prime), the roposed approach can compute up to $N^2$ additions per clock cycle. As an example, for a 251×251 image, for approximately 25% less resources, the fast and scalable DPRT (SFDPRT) is computed 39 times faster than the fastest known implementation. For the fastest case, the scalable architecture can be further reduced to obtain the FDPRT and iFDPRT in $2N+\lceil \log_2 N \rceil+1$ and $2N+3\lceil \log_2 N \rceil+B+2$ cycles respectively (B is the number of bits used to represent each input pixel). Generic and parameterized architectures are developed in VHDL and validated using an FPGA implementation as described more fully below.

For purposes of this application, the following notation is introduced. N×N images are considered where N is prime. $Z_N$ denotes the non-negative integers: $\{0, 1, 2, \ldots, N-1\}$, and $l^2(Z_N^2)$ be the set of square-summable functions over $Z_N^2$ with $f \in l^2(Z_N^2)$ being a 2-D discrete function that represents an N×N image, where each pixel is a positive integer value represented with B bits. Subscripts are used to represent rows. For example, $f_k(j)$ denotes the vector that consists of the elements of f where the value of k is fixed. Similarly, for R(r, m, d), $R_{r,m}(d)$ denotes the vector that consists of the elements of R with fixed values for r, m. It is noted that all are fixed but the last index.

Figure 1:
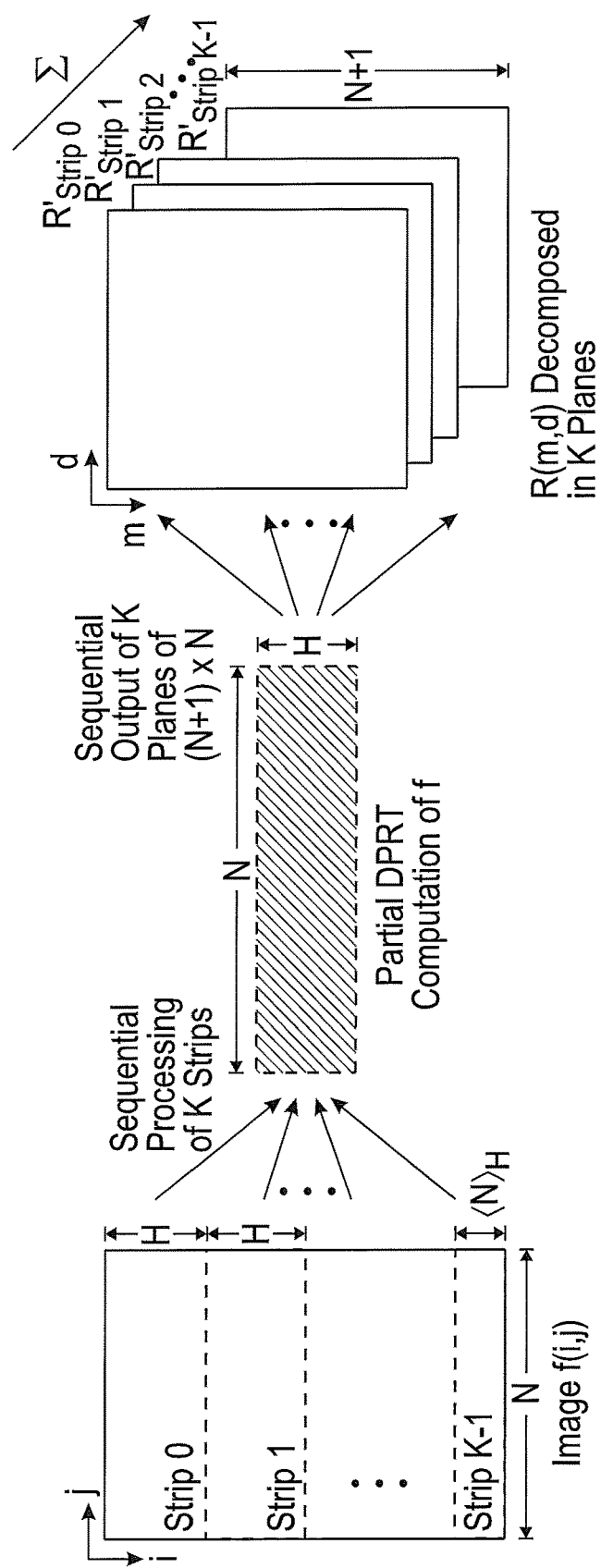
FIG. 1 illustrates a diagram of the scalable Discrete Periodic Radon Transform (DPRT) according to one embodiment of the invention.

FIG. 1 illustrates a diagram of the scalable Discrete Periodic Radon Transform (SFDPRT) according to one embodiment of the invention. As shown in FIG. 1, an input image f of N×N size is divided into strips K. Each strip K is made of H rows of pixels, except for the last one that is composed of the remaining number of rows needed to cover all of the N rows. The height of the last strip is $\langle N \rangle_H \neq H$ since N is prime. With K being the number of strips, $K = \lceil N/H \rceil$. With r denoting the r-th strip, the DPRT can be computed over each strip using:

$$R(m, d) = \begin{cases} \sum_{r=0}^{K-1}\sum_{i=0}^{L(r)-1} f(i+rH, \langle d+m(i+rH)\rangle_N), & 0 \leq m < N \\ \sum_{r=0}^{K-1}\sum_{j=0}^{L-1} f(d, j+rH), & m = N \end{cases}$$

where $$L(r) = \begin{cases} H, & r < K-1 \\ \langle N \rangle_H & r = K-1 \end{cases}$$

R'(r, m, d) denotes the r-th partial DPRT defined by:

$$R'(r, m, d) = \begin{cases} \sum_{i=0}^{L(r)-1} f(i+rH, \langle d+m(i+rH)\rangle_N), & 0 \leq m < N \\ \sum_{r=0}^{L(r)-1} f(d, j+rH), & m = N \end{cases}$$

where r=0, ..., K−1 is the strip number. The DPRT is computed by accumulating the partial sums from each strip. Specifically, the DPRT is computed as a summation of partial DPRTs using:

$$R(m, d) = \sum_{r=0}^{K-1} R'(r, m, d).$$

Similarly, the partial inverse DPRT, or iDPRT, of R(m, d) uses $$f'(r, i, j) = \sum_{m=0}^{L(r)-1} R(m+rH, \langle j-i(m+rH)\rangle_N)$$

which allows the computation of iDPRT of R(m, d) using a summation of partial iDPRTs according to:

$$f(i, j) = \frac{1}{N}\left[\sum_{r=0}^{K-1} f'(r, i, j) - S + R(N, i)\right]$$

Scalability is achieved by controlling the number of rows used in each rectangular strip. Thus, for the fastest performance, the largest strip size is chosen that can be implemented using available hardware resources. The final result is computed by combining the DPRTs.

Figure 2:
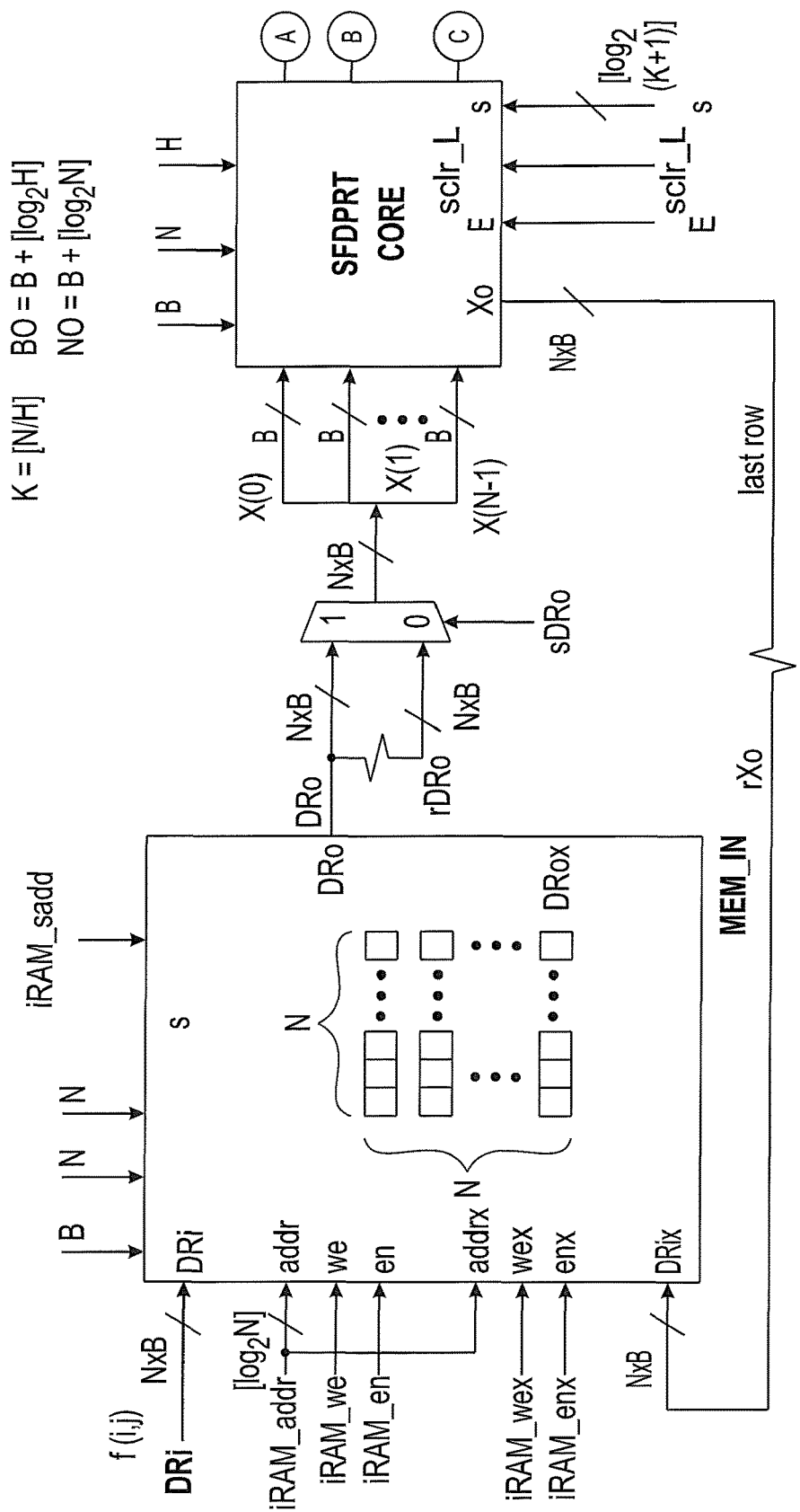
FIG. 2 illustrates a diagram of a system architecture for processing the scalable and fast Discrete Periodic Radon Transform (SFDPRT) according to one embodiment of the invention.
Figure 2:
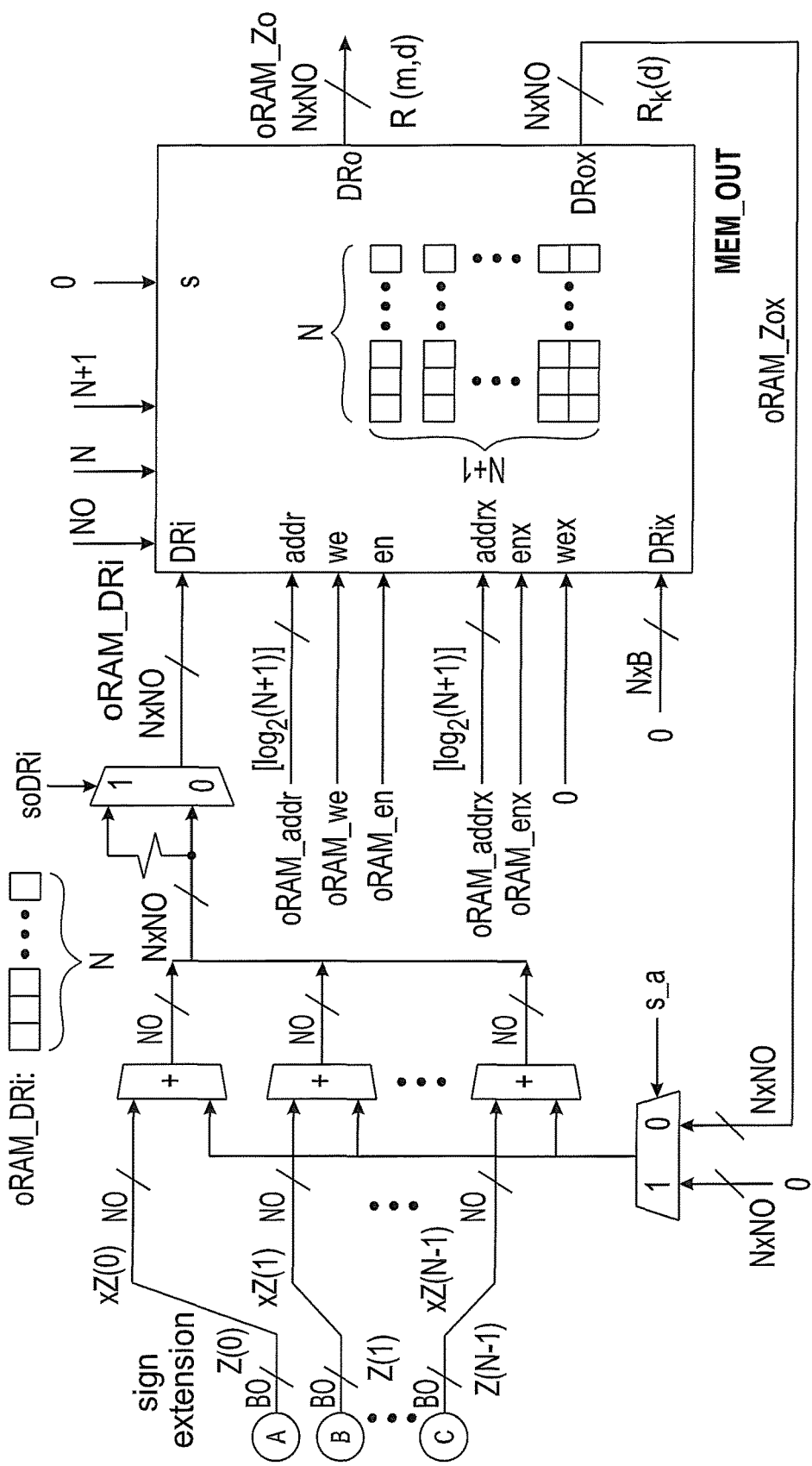
Figure 2:
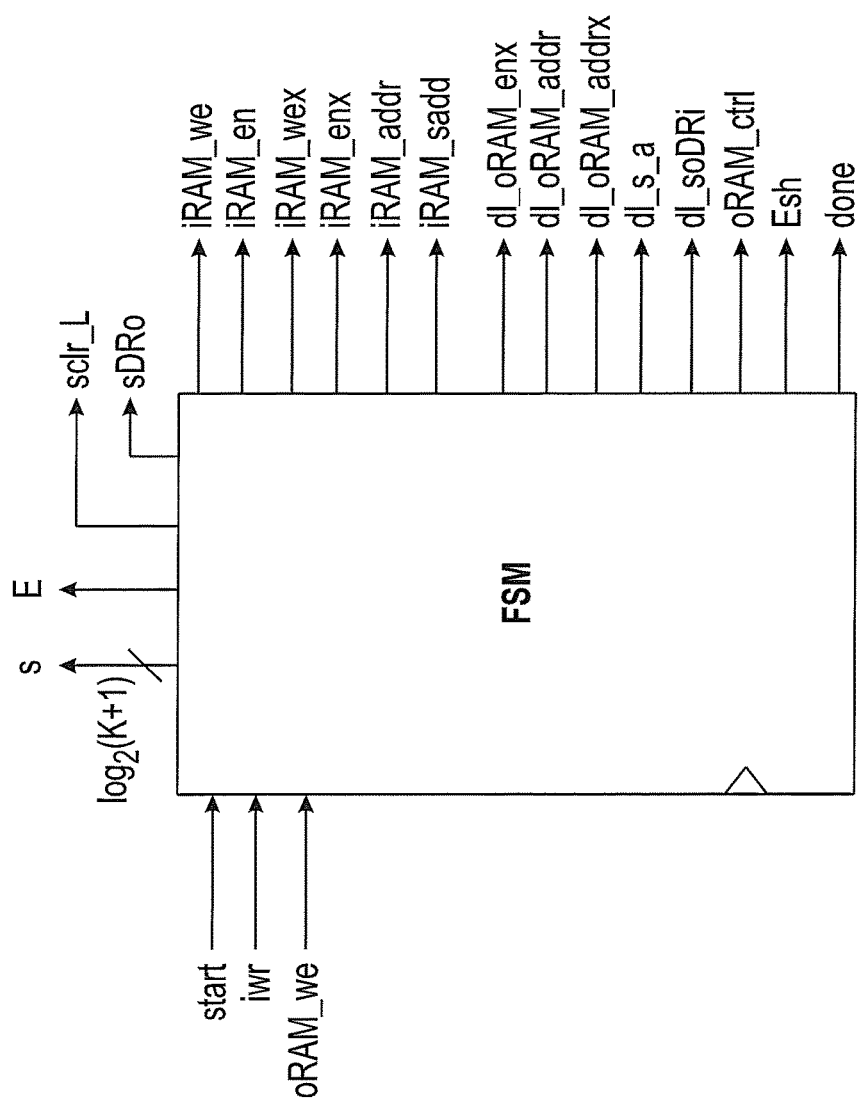
Figure 2:
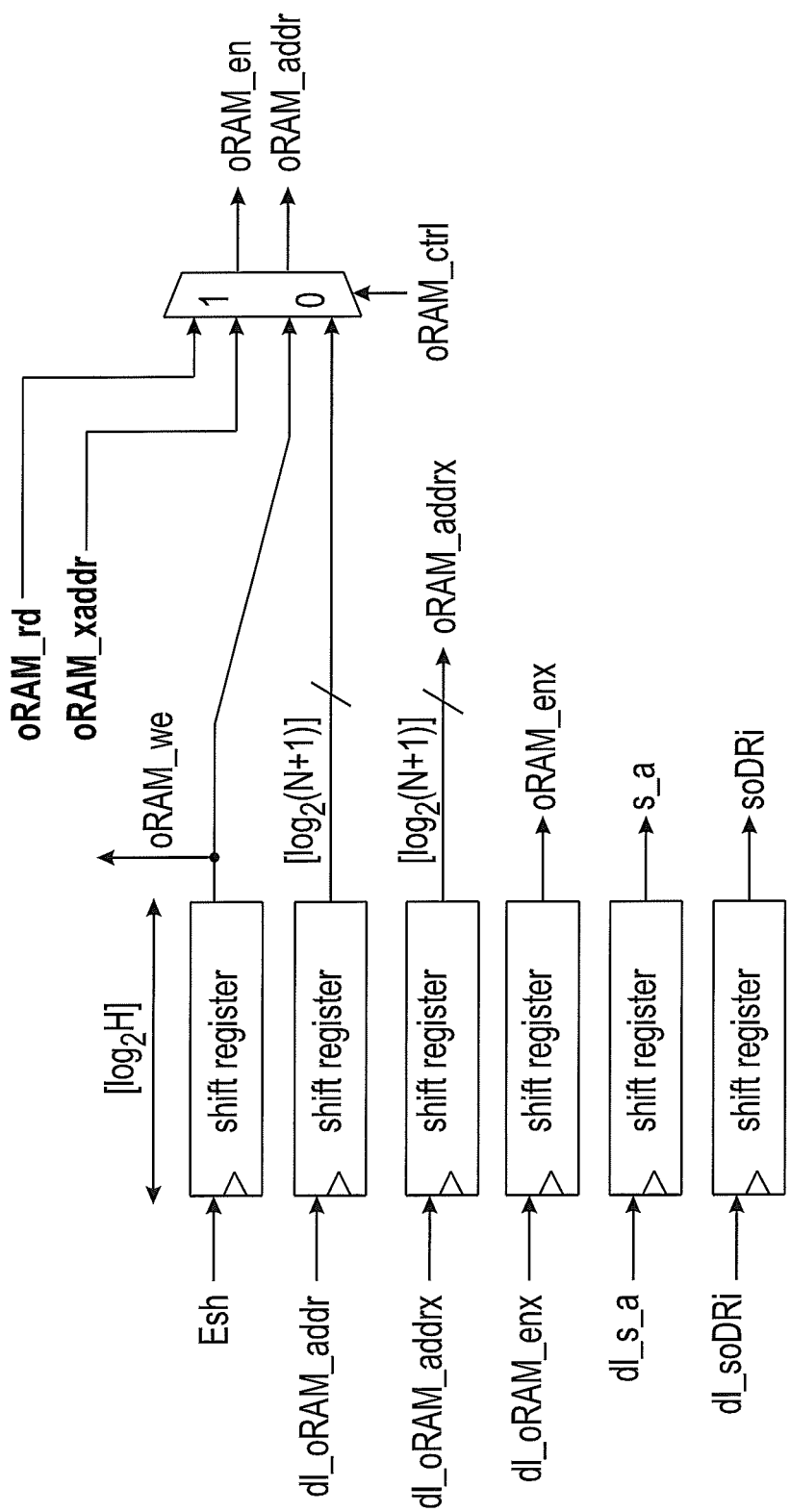

FIG. 2 illustrates a diagram of a system architecture for processing the SFDPRT according to one embodiment of the invention. As shown in FIG. 2, the system 200 includes three basic hardware blocks: the input memory block (MEM_IN) 202, the partial DPRT computation block (SFDPRT core) 204, and output/accumulator memory block (MEM_OUT) 206. The input image f is loaded into the input buffer MEM_IN 202 which can be implemented using a custom RAM that supports access to each image row or column in a single clock cycle. Partial DPRT computation is performed using the SFDPRT core 204. The SFDPRT core 204 is implemented using an H×N register array with B bits depth so as to be able to store the contents of a single strip.

Each row of the SFDPRT core register array is implemented using a Circular Left Shift (CLS) register that can be used to align the image samples along each column. Each column of this array has a H-operand fully pipelined adder tree capable to add the complete column in one clock cycle. The output of the adder trees provide the output of the SFDPRT core 204, which represents the partial DPRT of f. The combination of shift registers and adders allows the computation of H×N additions per clock cycle with a latency of $\lceil \log_2 H \rceil$. At the end, the outputs of the SFDPRT core 204 are accumulated using MEM_OUT 206. The finite state machine (FSM) 208 implements the algorithm for processing the SFDPRT according to one embodiment of the invention as shown in FIG. 3.

According to the algorithm shown in FIG. 3, within each loop, all of the operations are pipelined. Then, each iteration takes a single cycle. For example, the Shift, pipelined Compute, and the Add operations of lines 5, 6, and 7 are always computed within a single clock cycle.

Figure 4:
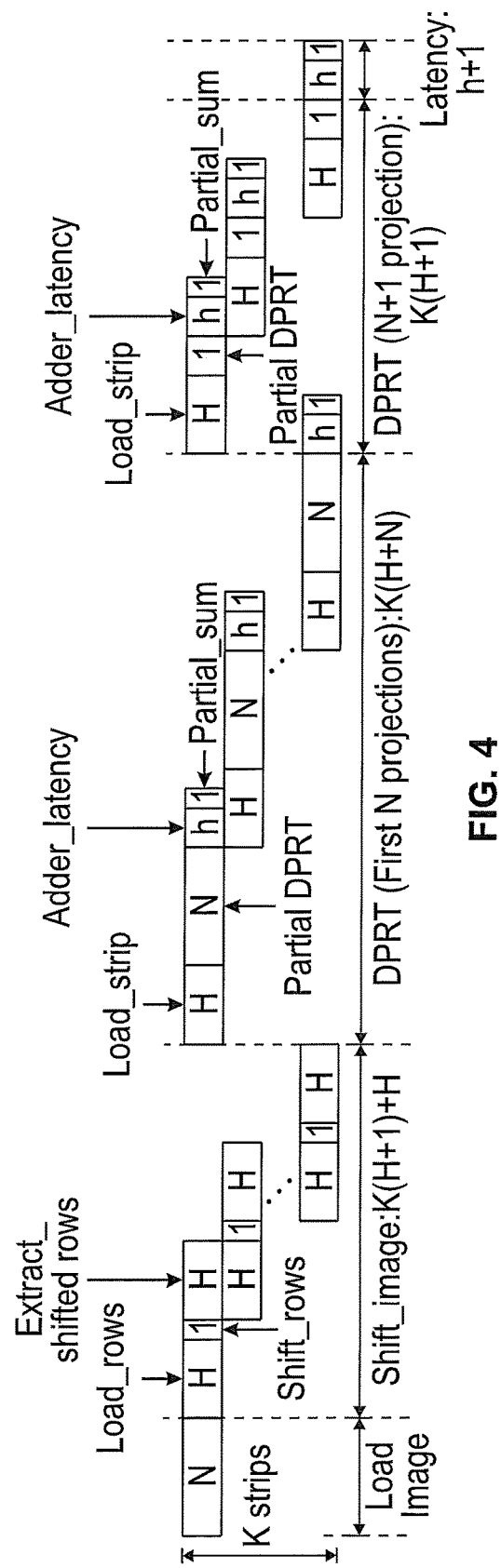
FIG. 4 illustrates a diagram of the running time for SFDPRT according to one embodiment of the invention.

FIG. 4 illustrates a diagram of the running time for SFDPRT according to one embodiment of the invention. As shown in FIG. 4, time increases to the right. The image is decomposed into K strips. Then, the first strip appears in the top row and the last strip appears in the last row of the diagram. Here, H denotes the maximum number of image rows in each strip, K=⌈N/H⌉ is the number of strips, and h=⌈log₂ H⌉ represents the addition latency. The algorithm according to FIG. 3 requires K(N+3H+2)+N+H+h+1 cycles for computing the full DPRT. The algorithm begins with loading a shifted version of the image into MEM_IN. The process of loading the input image, shifting, and storing the result back in MEM_IN is described in further detail in FIG. 10. The significance of this step is that the stored image allows computation of the last projection in a single cycle without the need for transposition. Rows and columns of MEM_IN can be accessed in a single clock cycle. As shown in FIG. 3, outer loop in lines 2-9 computes the partial DPRT for each one of the K=⌈N/H⌉ strips. Inside the loop, in line 3, strip r is loaded into the SFDPRT core as described more fully in FIG. 11. The partial DPRT for the strip r is computed in the inner loop according to lines 4-8. For computing the full DPRT, the partial DPRT outputs are accumulated in MEM_OUT as given in FIG. 12. For the last projection, special computations is required as outlined in lines 10-15. This special treatment is due to the fact that unlike the first N projections that can be implemented effectively using shift and add operations of the rows, the last projection requires shift and add operations of the columns.

Figure 5:
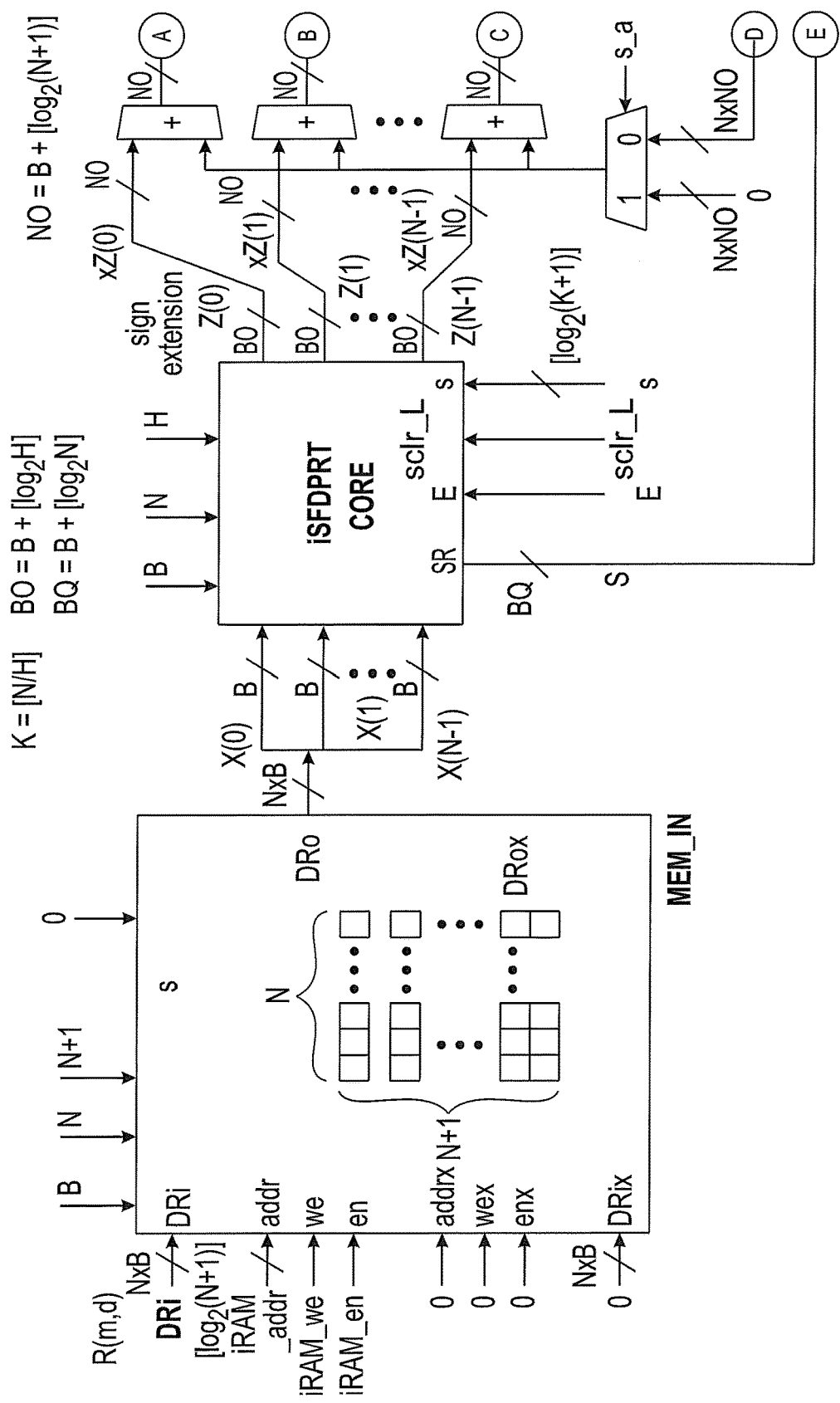
FIG. 5 illustrates a diagram of a system architecture for processing the inverse scalable and fast Discrete Periodic Radon Transform (iSFDPRT) according to one embodiment of the invention.
Figure 5:
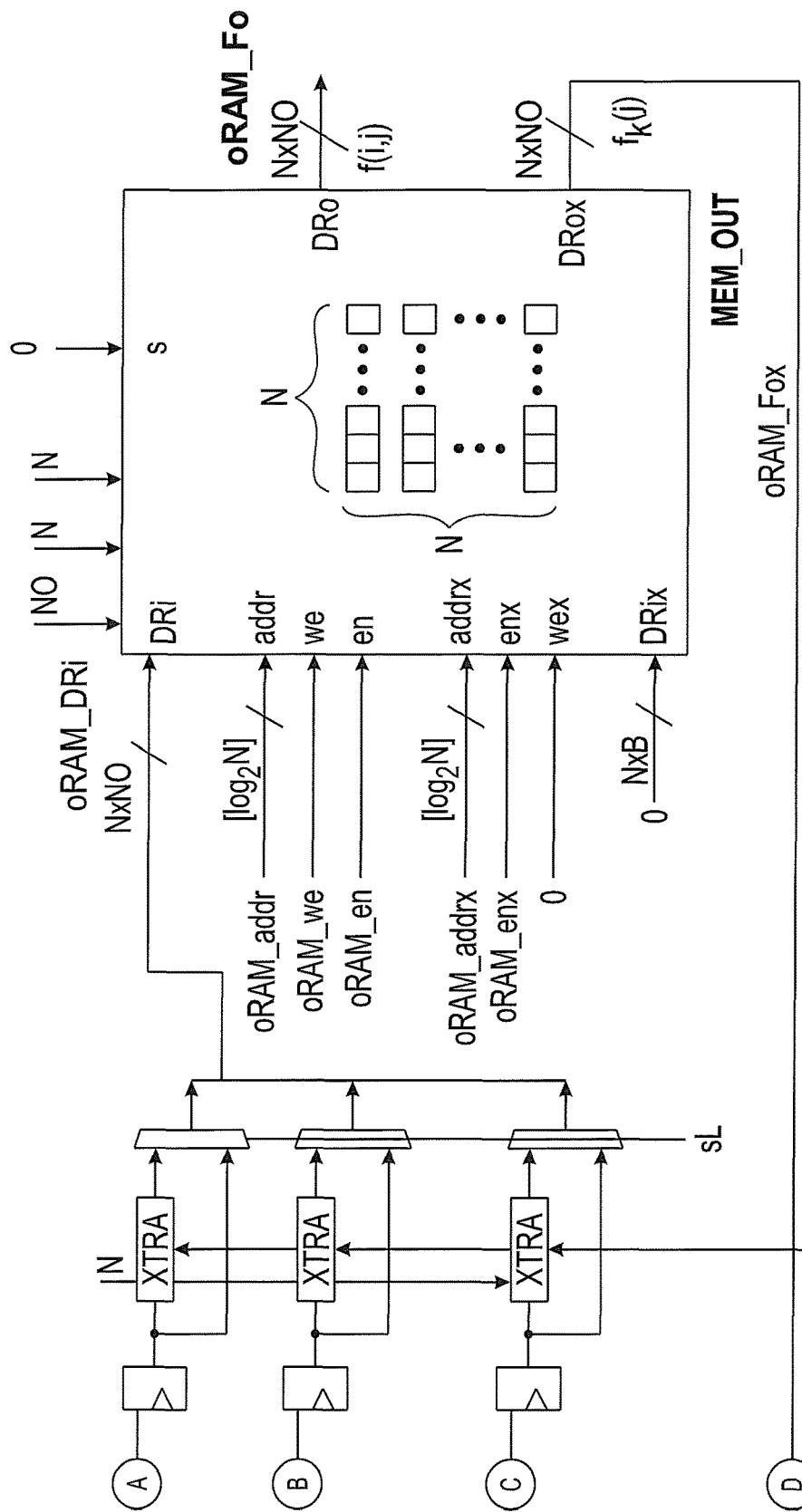
Figure 5:
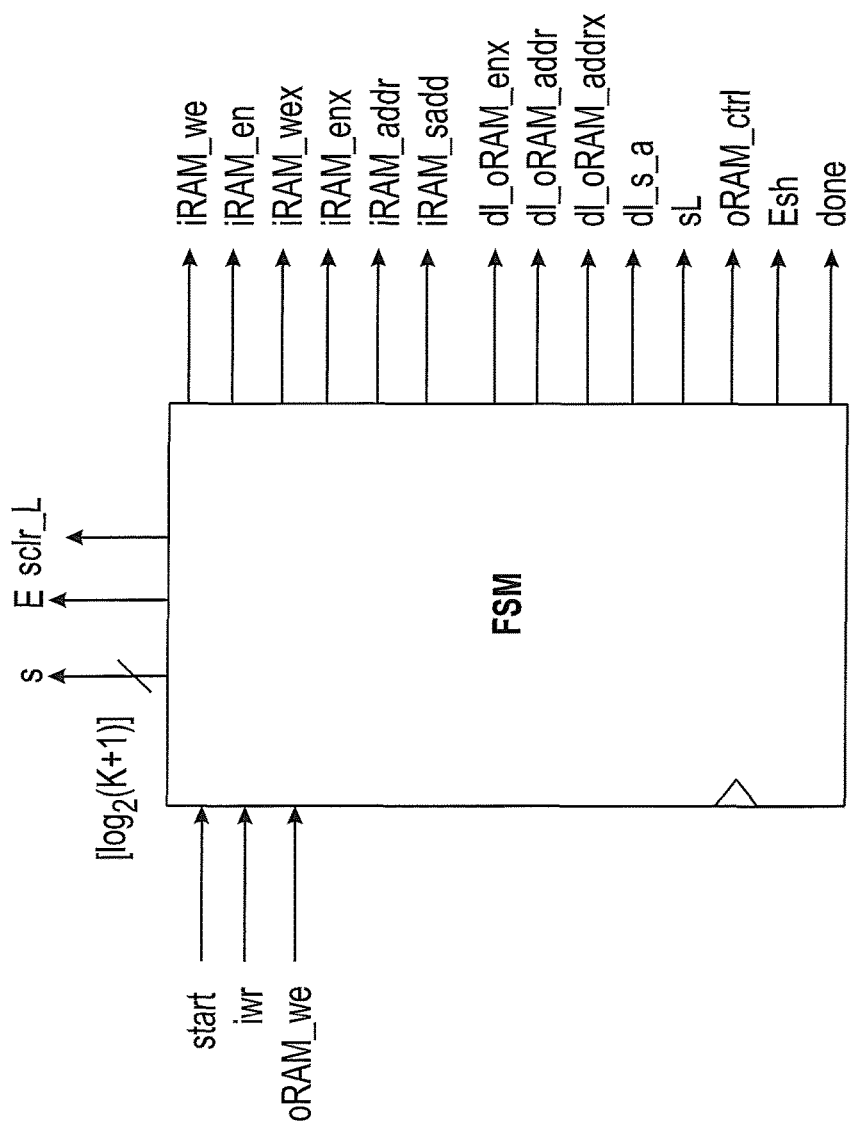
Figure 5:
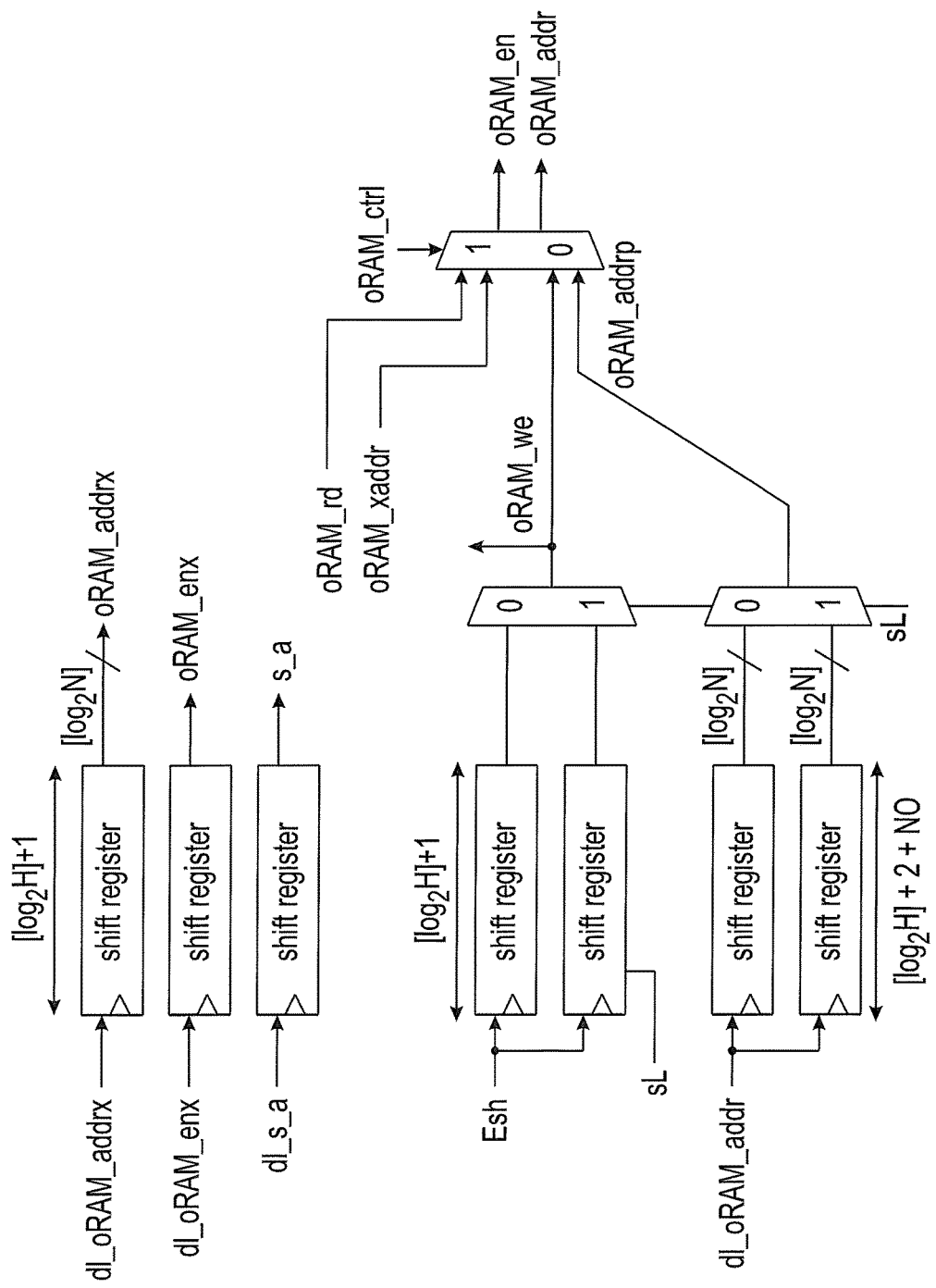

FIG. 5 illustrates a diagram of a system architecture for processing the inverse scalable and fast Discrete Periodic Radon Transform (iSFDPRT) according to one embodiment of the invention. As shown in FIG. 5, the system 500 includes three basic hardware blocks: the input memory block (MEM_IN) 502, the inverse DPRT computation block (iSFDPRT core) 504, and output/accumulator memory block (MEM_OUT) 506. The system 500 uses the iSFDPRT core 504 for computing partial sums a Finite State Machine (FSM) 508 for control.

There are differences between SFDPRT and iSFDPRT with respect to input size, transposition, and circular right shifting. With respect to input size, the input is R(m, d) with a size of (N+1)×N pixels. Since less terms are needed for computation, there is no transposition of the input image. Thus, the horizontal sums that required fast transposition are no longer needed. As a result, use of MEM_IN is optional and only needed to buffer/sync the incoming data. In specific implementations, MEM_IN may be removed provided that the data can be input to the hardware in strips as described in the algorithm as shown in FIG. 6.

FIG. 6 illustrates an algorithm for processing the iSFD-PRT according to one embodiment of the invention. With the exception of the strip operations of lines 2 and 12, all other operations are pipelined and executed in a single clock cycle. The strip operations require H clock cycles where H represents the number of rows in the strip. As seen in FIG. 6, $R_N(d)$ is added to each summation term and S is subtracted from each summation term.

Another difference between SFDPRT and iSFDPRT pertains to the shift array. Specifically, the circular right shifting (CRS) replaces circular left shifts (CLS) since the iDPRT index requires $\langle j-mi \rangle_N$ as opposed to $\langle d+mi \rangle_N$ for the DPRT.

FIG. 7 illustrates a diagram of the running time for iSFDPRT according to one embodiment of the invention. An optimized implementation is considered that uses pipelined dividers with a latency of as many clock cycles as the number of bits needed to represent the dividend. Thus, the total running time is K(N+H)+h+2+B+2n as illustrated in FIG. 7. Similar to the SFDPRT, the fastest iSFDPRT can be computed in linear time, i.e., grows with N not N²) using quadratic resources. As shown in FIG. 7, H denotes the maximum number of projection rows for each strip with K=⌈N/H⌉ representing the number of strips, h=⌈log₂ H⌉ represents the addition latency, n=⌈log₂ N⌉, and B+2n represents the number of bits used to represent the results before normalization.

The fastest possible implementations can be derived when the need to divide the input into strips (H=N) is eliminated resulting in the fast Discrete Periodic Radon Transform (FDPRT) and its inverse (iFDPRT). For both cases, the use of RAM is completely removed since the entire input can be held inside the register array. For the FDPRT, the register array is also be modified to implement the fast transposition that is required for the last projection (transposition time=1 clock cycle).

Overall, after accounting for the time to load the image into the register array, the FDPRT can be computed in 2N+n+1 cycles. For the iFDPRT, the architecture is basically reduced to the CRS registers plus the adder trees. For the iFDPRT, there is an additional CLS(1), the subtraction of S and the normalizing factor (1/N) that is to be embedded inside the adder trees (see FIG. 13 for a 7×7 implementation example). FIG. 8 illustrates an algorithm for processing the inverse fast Discrete Periodic Radon Transform (iFDPRT) according to one embodiment of the invention. Overall, the iFDPRT requires 2N+3n+B+2 cycles.

For scalable architectures, t that are optimal in the multi-objective sense are considered. Two objectives considered by the invention include: (i) running time and (ii) hardware resources. An implementation is considered to be sub-optimal if another (different) implementation can be found that runs at the same time or faster for the same or less hardware resources, excluding the case where both the running time and computational resources are equal. The set of realizations that are not sub-optimal form the Pareto-front of realizations that are optimal in the multi-objective sense. As an example, the invention may be connected to integrated circuits and dynamic management of hardware resources in an embedded system via multi-objective optimization as described in U.S. patent application Ser. No. 14/069,822 filed on Nov. 11, 2013, which is incorporated by reference in its entirety.

Considering the set of Pareto-optimal architectures for a fixed image size N. The image is partitioned into K strips where each one contains H rows of the input image. Since N is prime, then N=KH cannot be had. This implies all of the strips will not be completely filled up, i.e., there will always be rows that do not contain image data. Thus, the last strip uses H−1 rows.

Furthermore, it is easy to see that having the maximum of H−1 rows in the last strip provides the best use of hardware resources. More generally, it is desired to minimize the number of unused image rows in the last strip. Formally, for any given N, the entire set of Pareto-optimal realizations can be derived as given by:

$$\min_H H\left\lceil \frac{N}{H} \right\rceil - N \text{ subject to } \left\lceil \frac{N}{H} \right\rceil = K$$

where the number of strips can vary $$K = 2, 3, \ldots \left\lceil \frac{N}{2} \right\rceil.$$

Figure 9:
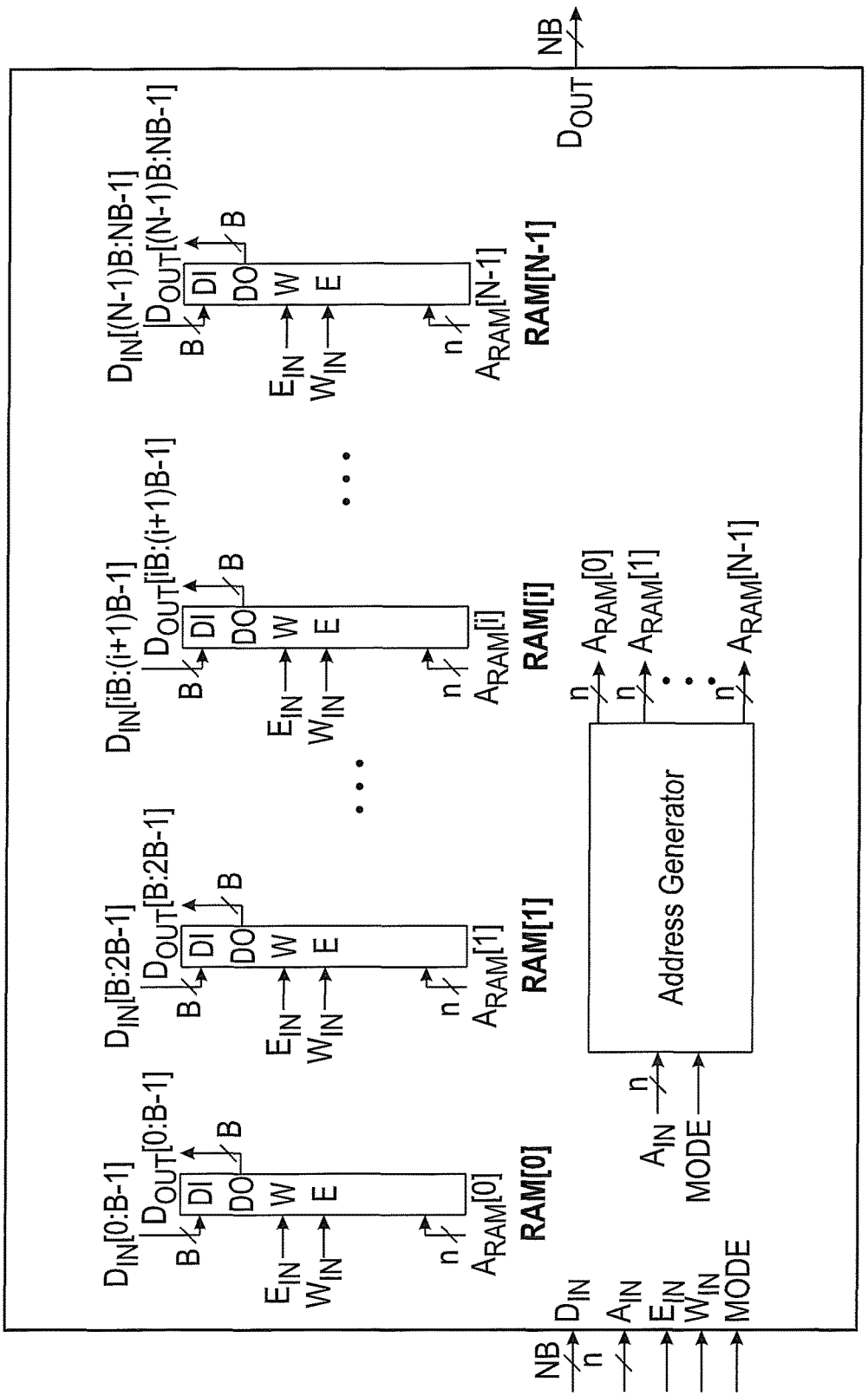
FIG. 9 illustrates a block diagram of the memory components MEM_IN and MEM_OUT according to one embodiment of the invention.

The upper limit of $$K = \left\lceil \frac{N}{2} \right\rceil$$

comes from the requirement that at least two rows in each strip are kept, i.e., H=2. FIG. 9 illustrates a block diagram of the memory components MEM_IN and MEM_OUT (see FIG. 2) according to one embodiment of the invention for parallel read/write.

For the parallel load, refer to FIG. 10. FIG. 10 illustrates an algorithm for shifting the input image (line 1 of FIG. 3) during loading according to one embodiment of the invention. The algorithm shifts the input image during the loading process in order to avoid the transposition associated with the last projection. The shifting is performed using the circular left shift registers that are available in the SFDPRT core.

The memory allows transposition to be avoided as described in FIG. 11. FIG. 11 illustrates an algorithm for loading the strips of the input image (line 3 and line 11 of FIG. 3) according to one embodiment of the invention.

FIG. 12 illustrates an algorithm for accumulating the partial DPRT results computed for each strip (line 14 of FIG. 3) according to one embodiment of the invention. The process is pipelined where all the steps are executed in a single clock cycle.

The memory components of the invention include RAM-blocks that are standard Random Access Memory (RAM) with separate address, data read, and data write buses. The MODE signal is used to select between row and column access. For row access, the addresses are set to the value stored in $A_{RAM}[0]$. Column access is only supported for MEM_IN. The addresses for column access are determined using: $A_{RAM}[i] = \langle A_{RAM}[0] + i \rangle_N$, i=1, . . . , N−1.

The algorithm for processing the SFDPRT of FIG. 3 is summarized by the following steps. First, a N×N image is loaded row-wise in MEM_IN as shown in line 1 of FIG. 10.

Second, image strips are loaded into SFDPRT core, shifted and written back to MEM_IN as described in FIG. 10. At the end of this step, the image is rearranged so that each diagonal corresponds to an image column. This allows each row of the transposed image to be obtained in one cycle.

Third, image strips are loaded into the SFDPRT core and left-shifted once as described in FIG. 11. For the first N projections, the results from partial DPRTs computed for each strip are accumulated as described in FIG. 12. An adder array is used to compute the accumulated sums. Also, for pipelined operation, MEM_OUT is implemented as a dual port memory.

Lastly, to avoid transposition the input image is accessed in column mode for the last projection. The rest of the process is the same as for the previous N projections. The transform is computed using exact arithmetic using $NO = B + \lceil \log_2 N \rceil$ bits to represent the output where the input uses B-bits per pixel.

Figure 13:
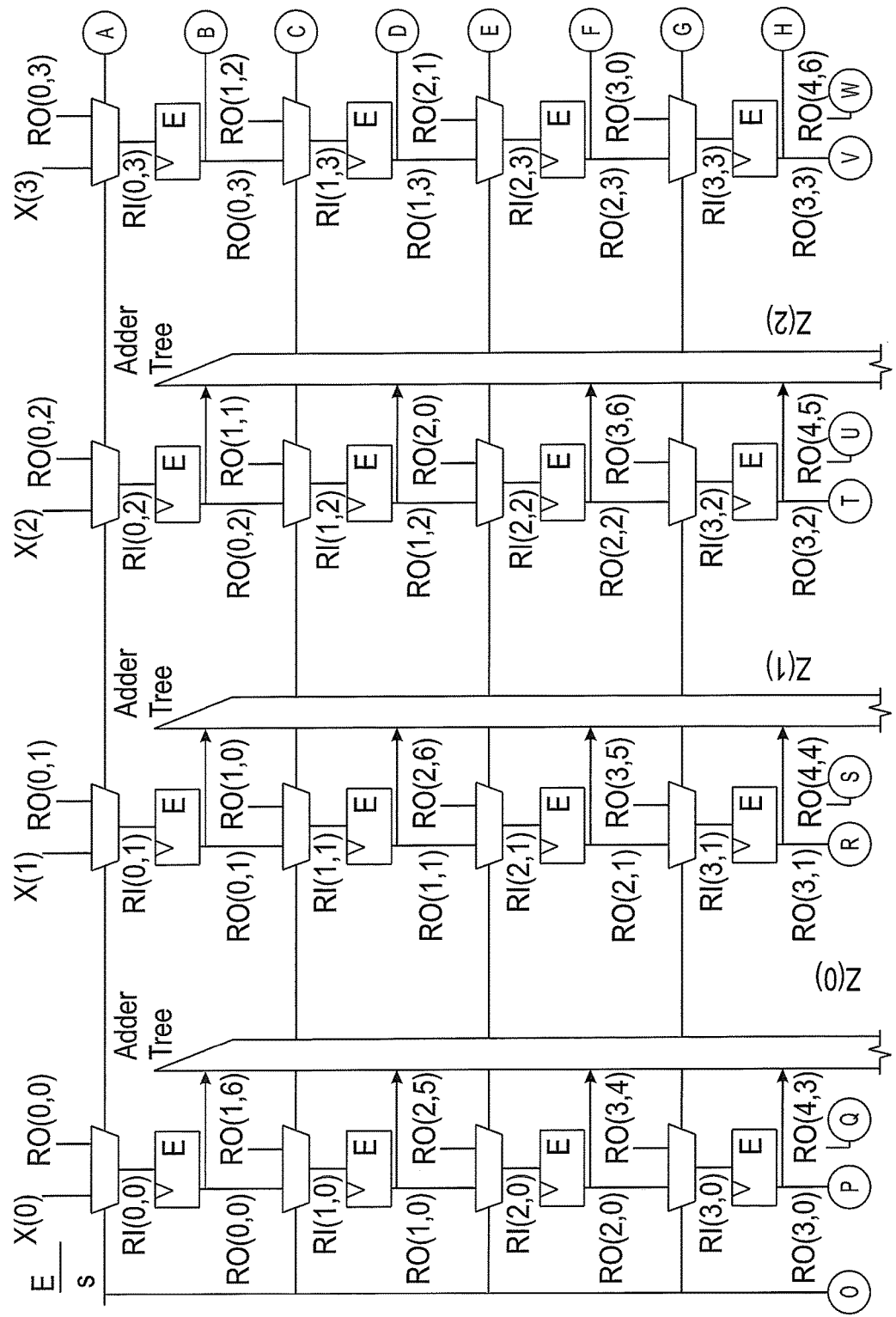
FIG. 13 illustrates the hardware implementation for the inverse fast Discrete Periodic Radon Transform (iFDPRT) according to one embodiment of the invention.
Figure 13:
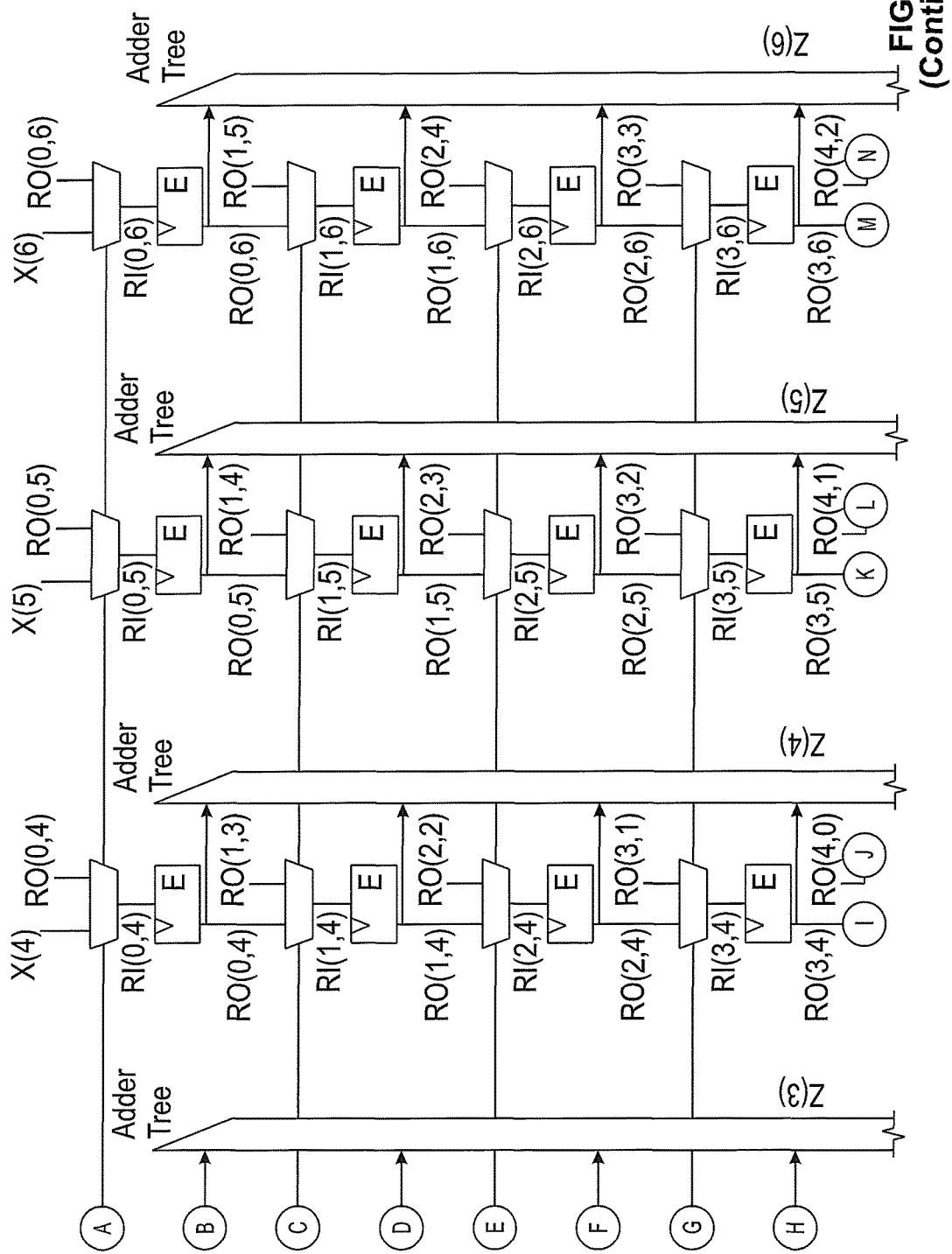
Figure 13:
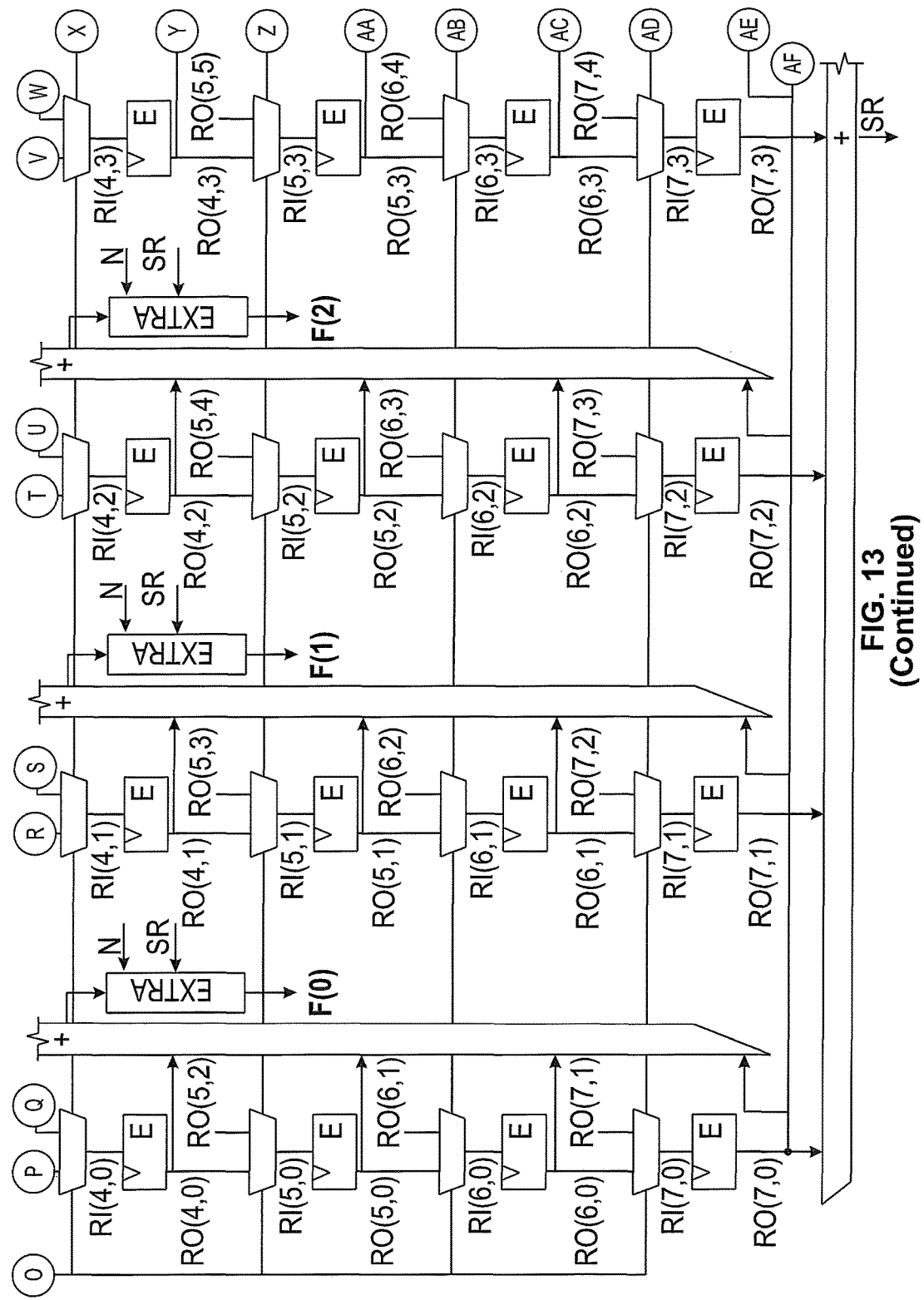
Figure 13:
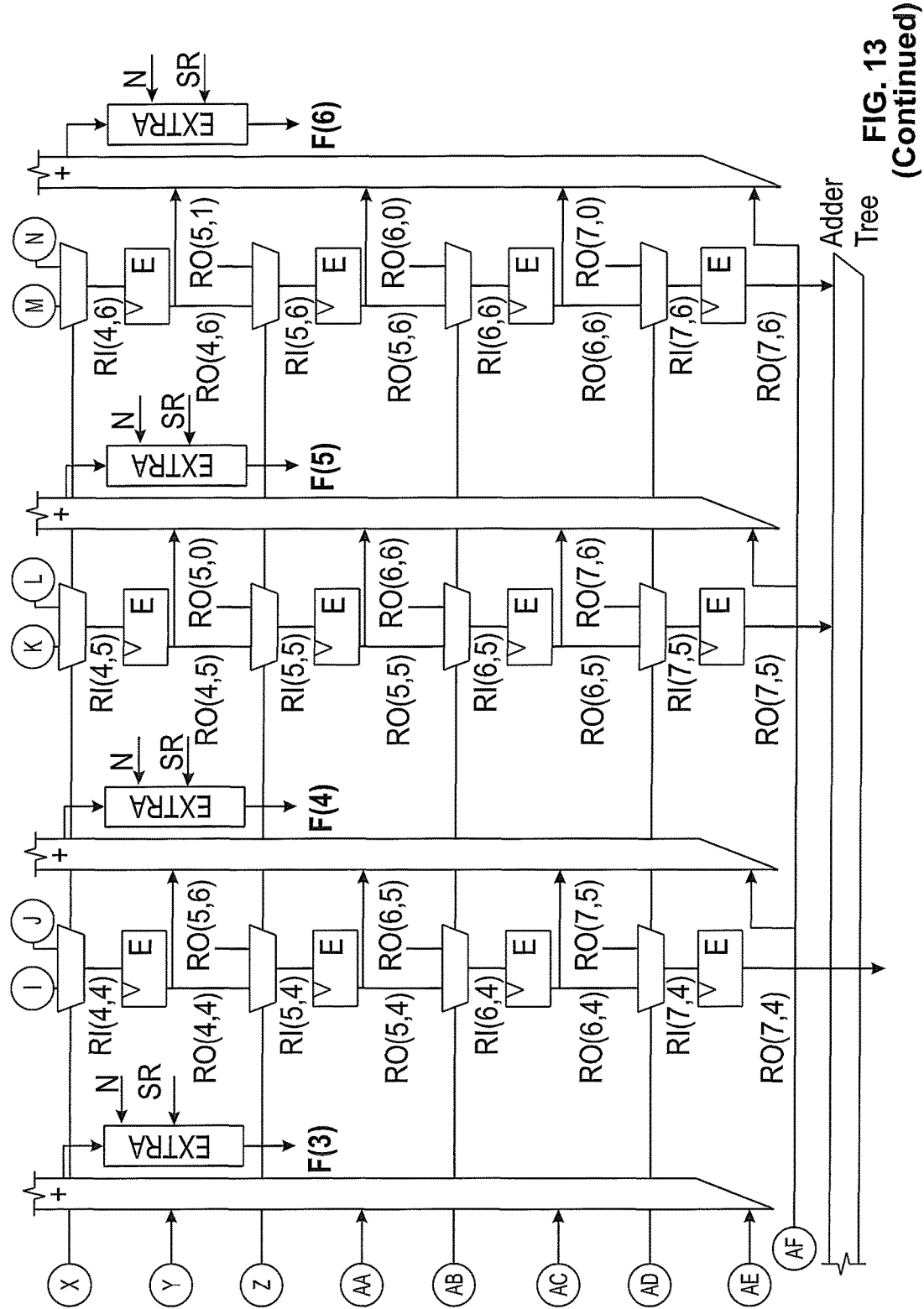

According to the invention, inverse DPRT implementations include inverse scalable and fast Discrete Periodic Radon Transform (iSFDPRT) and inverse fast Discrete Periodic Radon Transform (iFDPRT). The iFDPRT hardware implementation is shown in FIG. 13. The iFDPRT core shows the adder trees, register array, and 2-input MUXes. The 'extra circuit' is not needed for the forward DPRT. Also, for latency calculations, the 'extra circuit' has a latency of 1+BO cycles.

As shown in FIG. 13, the core generates an N×N output image based on an (N+1)×N input array. Specifically, FIG. 13 shows the array (N=7) where the shift is now to the right. Unlike the FDPRT core, add R(N, j) needs to be added to account for an element of the last projection for each computed direction j. The sum SR of a row is subtracted and the result divided by N. The transposition of the input array is not required. A total of N directions are generated, where each direction is an N-element vector F(i), i=0, . . . , N−1.

Multiplexers (MUXes) are used to support loading and shifting as separate functions. The vertical adder trees generate the Z(i) signals. A new row of Z(0), Z(1), . . . , Z(N−1) is generated for every cycle. The horizontal adder tree computes SR. The SR computation is the same for all rows. The latency of the horizontal adder tree is $\lceil \log_2 N \rceil$ cycles. SR is ready when Z(i) is ready, as the latency of the vertical adder trees is $\lceil \log_2(N+1) \rceil$. The SR value is fed to the 'extra units', where all Z(i)'s subtract SR and then divide by N. The term R(N, j) is included by loading the last input row on the last register row, where the shift is one to the left. It is always the same element (e.g., the left-most one) that goes to all vertical adders.

A summary of bit width requirements for perfect reconstruction is now provided. It is assumed that the Radon transform coefficients use B'-bits. The number of bits of the vertical adder tree outputs Z(i) are then set to $BO = B' + \lceil \log_2(N+1) \rceil$. The number of bits of SR need to be $BQ = B' + \lceil \log_2 N \rceil$. Assuming that the input image f is B bits, only B bits are needed to reconstruct the image and the relationship between B' and B needs to be: $B' = B + \lceil \log_2 N \rceil$ bits. For the subtractor, $Z(i) = \sum_{m=0}^{N-1} R(m, \langle j-mi \rangle_N) + R(N, i)$ and $Z(i) \geq SR$ since f(i, j)≥0. The result of Z(i)−SR is always positive requiring BO bits. Thus, for perfect reconstruction, the result F(i) needs to be represented using BO bits.

Figure 14:
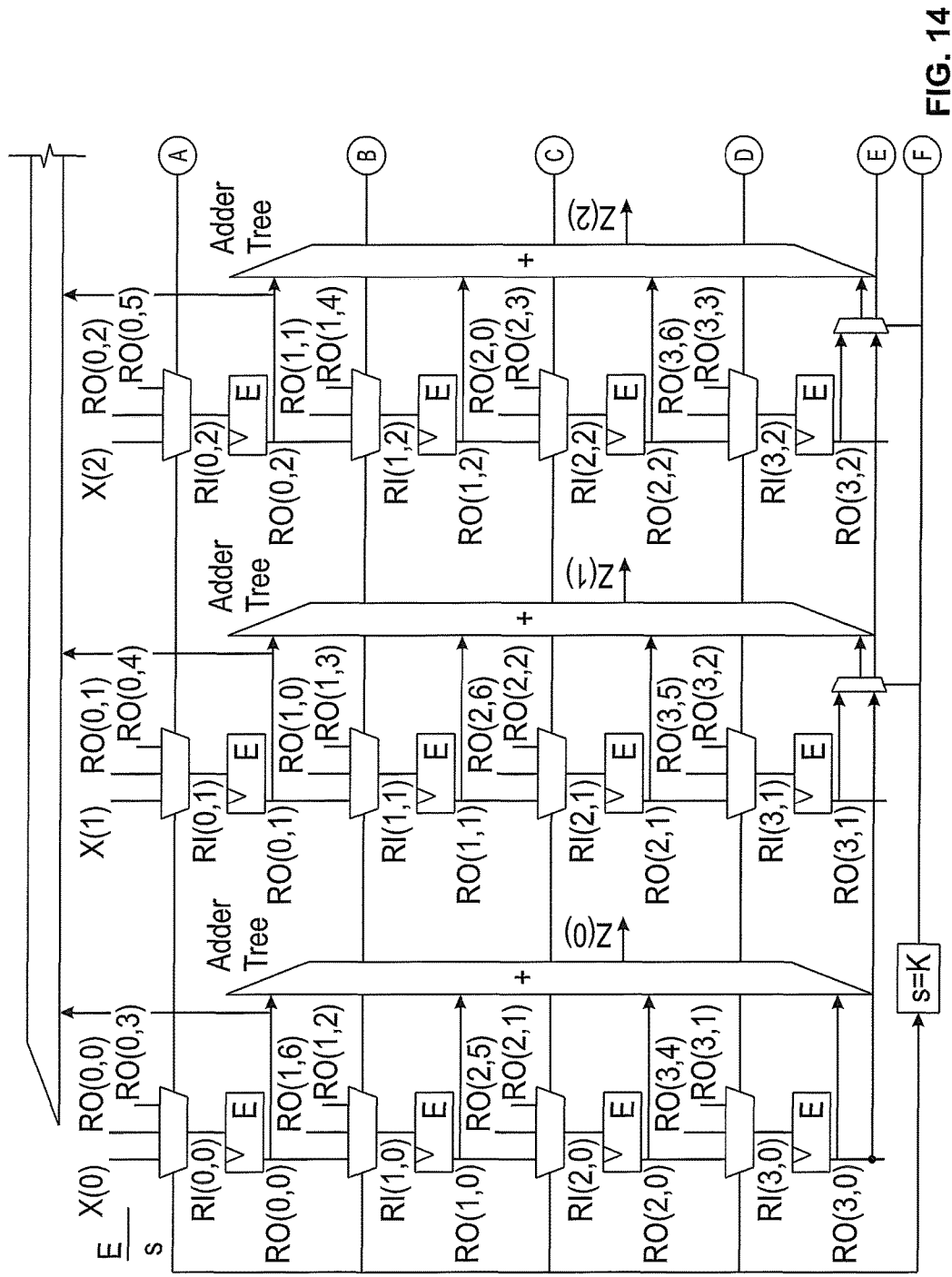
FIG. 14 illustrates the hardware implementation for the inverse scalable and aft fast Discrete Periodic Radon Transform (iSFDPRT) according to one embodiment of the invention.
Figure 14:
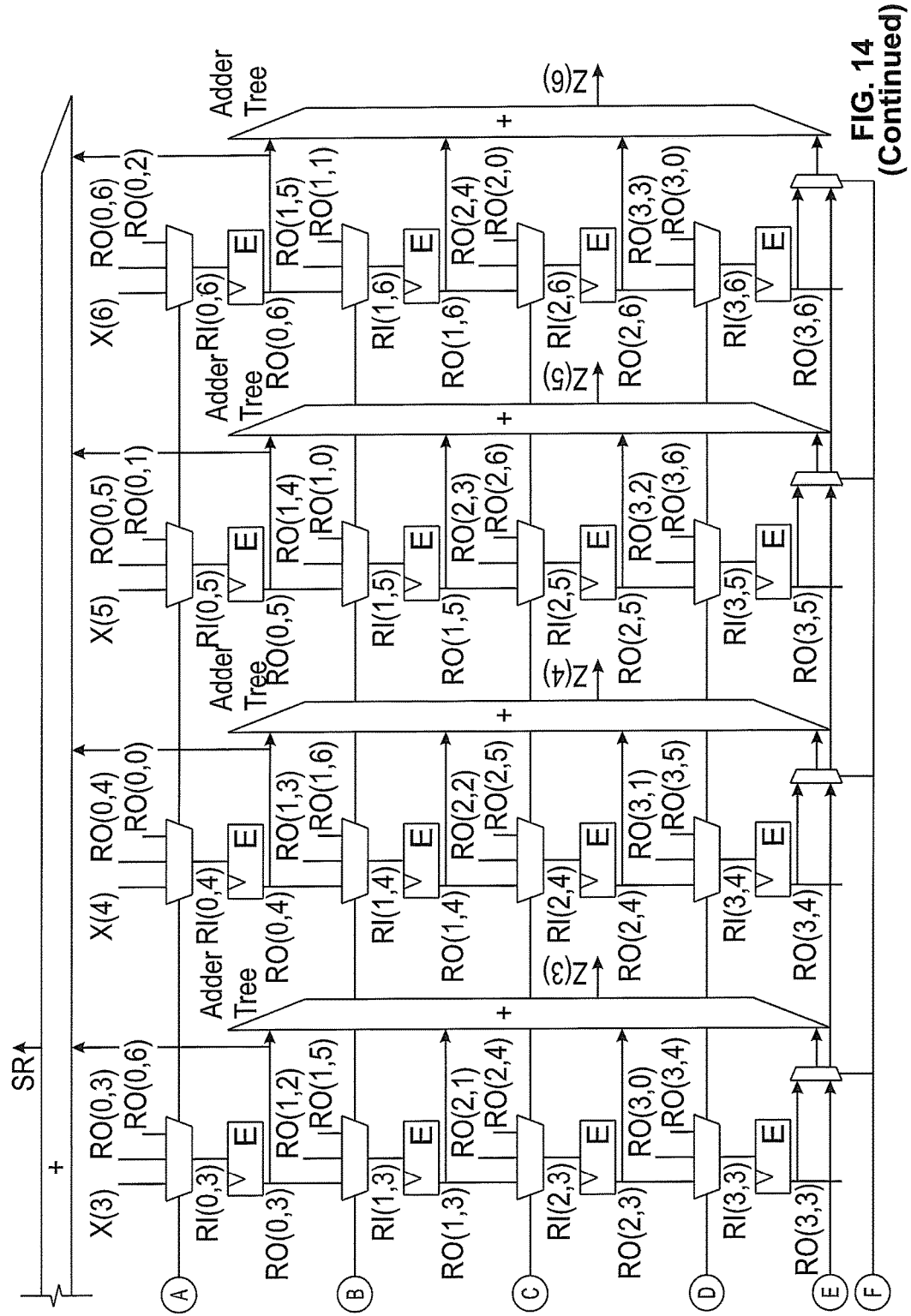

FIG. 14 illustrates the hardware implementation for the inverse scalable and aft fast Discrete Periodic Radon Transform (iSFDPRT) according to one embodiment of the invention. Specifically, FIG. 14 illustrates the instance of N=7 and H=4. The iSFDPRT core only generates the partial sums Z(i). The partial sums remain to be accumulated, subtracted by SR and divided by N.

For each strip, different amounts of right shifting need to be implemented. This is implemented using (K+1)-input MUXes. Since N is always prime, at least one row of the register array is unused during computations for the last strip. The unused row is used to load the term R(N, j). The vertical MUXes located on the last valid row of the last strip ensure that the term R(N, j) is considered only when the last strip is being processed. Here, for the last row of the last strip, the shift is required to be one to the left. Also, the remaining unused rows are fed with zeros.

Beyond the iSFDPRT core, there is also the input and output memories, an array of adders and divisors, and ancillary logic. According to the invention, the diagonal mode of the memories, flipping the data, or rearrangement of the input memory is not needed. The basic process consists of loading each strip, processing it on the iSFDPRT core, accumulating it to the previous result, and storing it in the output memory. For the last strip, the result is accumulated in addition to subtracting SR and dividing by N.

Figure 15:
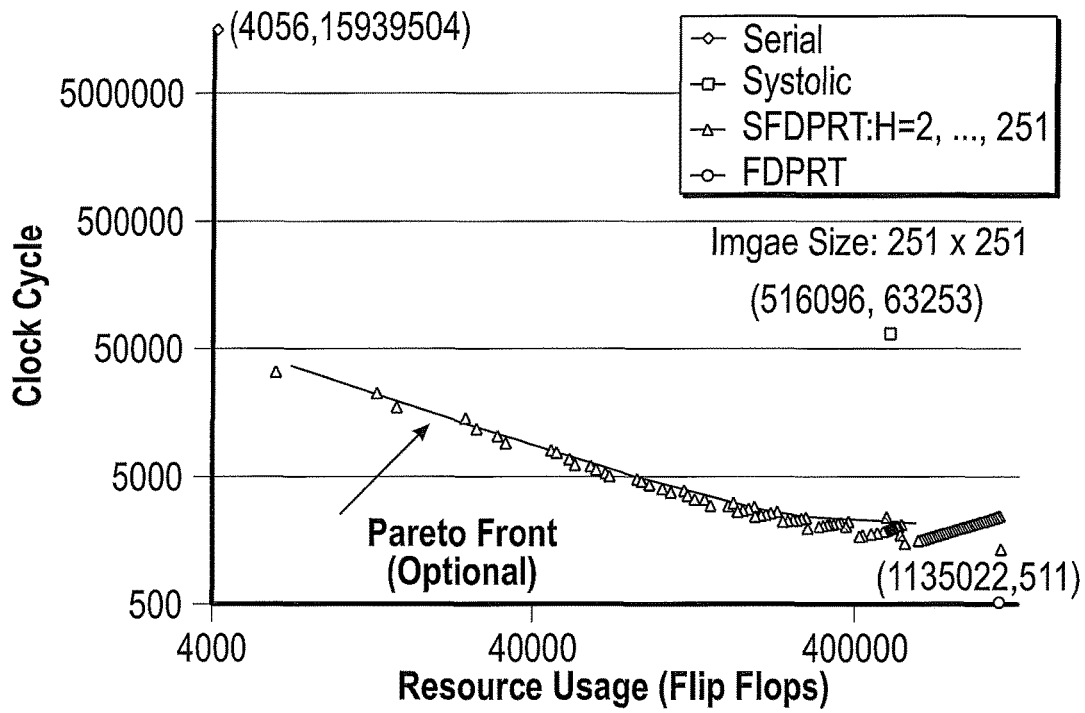
FIG. 15 illustrates a table pertaining to clock cycles for computing the Discrete Periodic Radon Transform (DPRT) according to the invention.

FIG. 15 illustrates a table pertaining to clock cycles for computing the forward DPRT according to the embodiment of the invention in which the image is of size N×N and the scaling factor is H=2, ..., N. The running time given in FIG. 15 is based on the timing diagram of FIG. 4.

Figure 16:
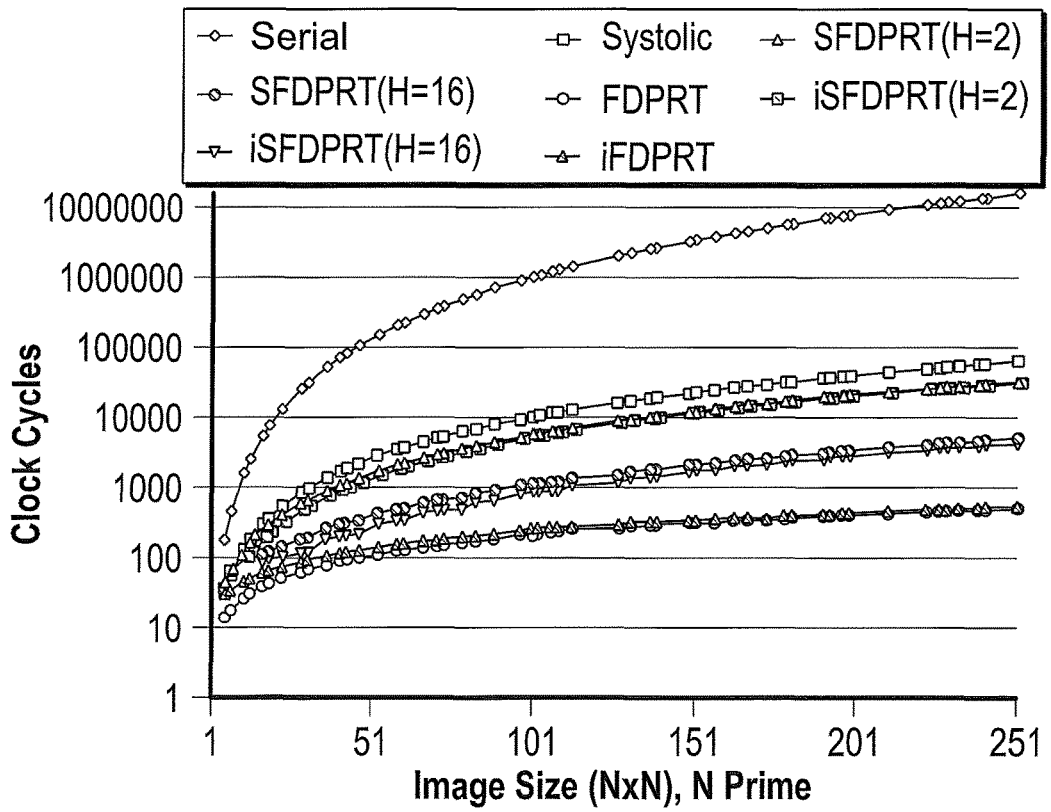
FIG. 16 illustrates a table pertaining to clock cycles for computing the inverse Discrete Periodic Radon Transform (iDPRT) according to the invention.

FIG. 16 illustrates a table pertaining to clock cycles for computing the inverse DPRT according to the embodiment of the invention in which the image is of size N×N, B is the bits per pixel and the scaling factor is H=2, ..., N. If MEM_IN is used, N clock cycles are added in the scalable DPRT.

Figures 17, 18:
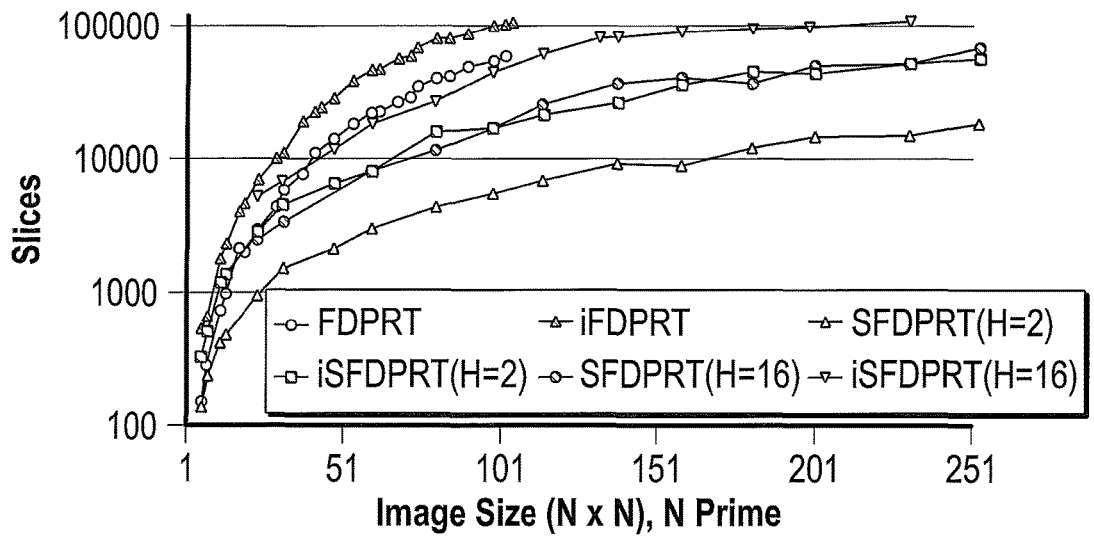
FIG. 17 illustrates a table pertaining resource usage for different DPRT and iDPRT implementations according to the invention.
FIG. 18 illustrates an algorithm for required adder tree resources according to one embodiment of the invention.

FIG. 17 illustrates a table pertaining resource usage for different DPRT and iDPRT implementations according to the invention. The required resources are reported in terms of the three major components: (i) total number of bits for register array, (ii) adder tree resources: number of flip-flops and 1-bit full adders, (iii) other resources: RAM size, dividers (inverse DPRT only), and 2-to-1 MUXes.

Overall, the invention results in the fastest running times. Even in the slowest case, the running time is better than any previous implementation. However, in some cases, the better running times come at a cost of increased resource usage. Thus, both running times and required resources are compared. As can be seen from FIG. 17, the number of flip-flops dominates the required resources since it grows linearly with the number required registers and adders.

FIG. 18 illustrates an algorithm for required adder tree resources as a function of the number of strip rows (H) and the number of bits per pixel (B). The resources do not include the input registers. However, the resources do include the output registers since they are implemented in SFDPRT core and iSFDPRT core.

The invention provides fast and scalable methods for computing the DPRT and its inverse. Overall, at comparable resources, the invention provides much faster computation of the DPRT. Furthermore, the scalable DPRT methods provide fast execution times that can be fitted in available resources.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A method for controlling hardware resources required for a computation of a Discrete Periodic Radon Transform (DPRT) comprising the steps of:
   receiving an input image;
   generating a shifted input image, wherein each row of the shifted input image has a different shift;
   loading the shifted input image into an input buffer;
   dividing the shifted input image into a plurality of image sample strips, each image sample strip consisting of a number of rows of pixels;
   determining one or more Pareto-optimal implementations of the DPRT by selecting the one or more Pareto-optimal implementations that satisfy $$\min_H H \left\lceil \frac{N}{H} \right\rceil - N$$

subject to $$\left\lceil \frac{N}{H} \right\rceil = K,$$

where H denotes the number of rows of pixels of each image sample strip, N is prime and represents a number of rows and a number of columns of the input image, and $$K = 1, 2, 3 \ldots \left\lceil \frac{N}{2} \right\rceil$$

represents a number of image sample strips;
   storing each image sample strip into a register array, the register array arranged as a row of registers or a column of registers, each row of registers having a width the same as the input image and each register having a bit depth the same as a bit depth of a selected pixel of the input image;
   shifting the row of registers or the column of registers of each image sample strip by the number of rows or the number of columns of the input image in a single clock cycle using the register array in order to align each image sample strip along the row of registers or the column of registers as required by a forward DPRT;
   computing summations of all image sample strips using a pipelined adder tree that produces outputs every clock cycle;
   outputting by the adder tree a partial DPRT of each image sample strip; and
   calculating the DPRT of the input image by accumulating the partial DPRTs in an output buffer, wherein the DPRT comprises a plurality of projections.

2. The method according to claim 1 further comprising the step of adjusting the number of rows or the number of columns of the input image used to compute the partial DPRT in order to control the hardware resources.

3. The method according to claim 1 wherein the register array is a circular right shift register array comprising an array of registers that shift sequences of numbers.

4. The method according to claim 1 wherein the register array is a circular left shift register array comprising an array of registers that shift sequences of numbers.

5. The method according to claim 1 wherein said computing step performs the summations along the column of registers.

6. The method according to claim 1 wherein said computing step performs the summations along the row of registers.

7. The method according to claim 1 wherein the number of rows or the number of columns of the input image starts at 0.

8. The method according to claim 1 wherein said generating step further comprises the step of using the register array to shift each row or each column of the input image by an integer number.

9. The method according to claim 1 wherein a last projection of each partial DPRT is computed in a single clock cycle.

10. The method according to claim 9 wherein the input buffer is a custom Random Access Memory (RAM) that allows access to a row or a column of the input image in one clock cycle.

11. The method according to claim 1 further comprising the steps of:
   computing a DPRT of a filter;
   applying one-dimensional convolution to each projection of the DPRT of the input image and to each projection of the DPRT of the filter to obtain convolved projections;

applying an inverse DPRT for each convolved projection; and reconstructing a final image.

12. The method according to claim 11 wherein the one-dimensional convolution of said applying step is performed directly to each projection of the DPRT of the input image and to each projection of the DPRT of the filter.

13. The method according to claim 11 wherein the one-dimensional convolution of said applying step is performed via a Fast Fourier Transform (FFT) to each projection of the DPRT of the input image and to each projection of the DPRT of the filter.

14. The method according to claim 1, wherein the register array is a 2D register array.

15. A method for controlling hardware resources required for a computation of an inverse Discrete Periodic Radon Transform (iDPRT) comprising the steps of:

receiving an input, the input comprising a DPRT of an input image;

loading the input into an input buffer;

dividing the input into a plurality of strips, each strip consisting of a number of rows of pixels;

determining one or more Pareto-optimal implementations of the inverse DPRT by selecting the one or more Pareto-optimal implementations that satisfy $$\min_H H \left\lceil \frac{N}{H} \right\rceil - N$$

subject to $$\left\lceil \frac{N}{H} \right\rceil = K,$$

where H denotes the number of rows of pixels of each strip, N is prime and represents a number of rows and a number of columns of the input image, and $$K = 1, 2, 3 \ldots \left\lceil \frac{N}{2} \right\rceil$$

represents a number of strips:

storing each strip into a register array, the register array arranged as a row of registers or a column of registers, each row of registers having a width the same as the input and each register having a bit depth the same as a bit depth of a selected pixel of the input;

shifting the row of registers or the column of registers of each strip by the number of rows or the number of columns of the input in a single clock cycle using the register array in order to align each strip along the row of registers or the column of registers as required by a forward DPRT;

computing summations along the row of registers or the column of registers of the input using a pipelined adder tree that produces outputs every clock cycle;

outputting by the adder tree a partial inverse DPRT of each strip;

calculating the inverse DPRT of the input by accumulating the partial inverse DPRTs in an output buffer, wherein the inverse DPRT comprises a plurality of projections;

summing each row of the input to obtain a sum;

subtracting the sum of any row of the input from the last partial inverse DPRT of each strip to obtain a value; and dividing the value by a total number of rows of the input to normalize the output.

16. The method according to claim 15 wherein the register array is a circular right shift register array comprising an array of registers that shift sequences of numbers.

17. The method according to claim 15 wherein the register array is a circular left shift register array comprising an array of registers that shift sequences of numbers.

18. The method according to claim 15, wherein the register array is a 2D register array.

19. A fast method for computing a discrete periodic radon transform (DPRT) comprising the steps of:

(a) receiving an input image comprising image sample strips, each image sample strip consisting of a number of rows of pixels;

(b) determining one or more Pareto-optimal implementations of the DPRT by selecting the one or more Pareto-optimal implementations that satisfy $$\min_H H \left\lceil \frac{N}{H} \right\rceil - N$$

subject to $$\left\lceil \frac{N}{H} \right\rceil = K,$$

where H denotes a number of rows of pixels of each image sample strip, N is prime and represents a number of rows and a number of columns of the input image, and $$K = 1, 2, 3 \ldots \left\lceil \frac{N}{2} \right\rceil$$

represents a number of image sample strips;

(c) storing the input image into a register array, the register array arranged as a row of registers or a column of registers, each row of registers having a width the same as the input image and each register having a bit depth the same as a bit depth of a selected pixel of the input image;

(d) shifting the row of registers or the column of registers of the input image by the number of rows or the number of columns of the input image in a single clock cycle using the register array;

(e) computing summations along the row of registers or the column of registers of the input image using a pipelined adder tree that produces outputs every clock cycle;

(f) outputting by the adder tree the outputs, the outputs comprising a plurality of DPRT projections; and (g) performing steps (d) and (e) for all projections of the plurality except for the last projection.

20. The fast method according to claim 19 wherein the following steps are performed on the last projection:

(h) transposing the register array in a single clock cycle; and (i) computing summations along the row of registers or the column of registers of the input image using the pipelined adder tree that produces the last projection in the single clock cycle.

21. The fast method according to claim 19 wherein the number of rows or the number of columns of the input image starts at 0.

22. The fast method according to claim 19 wherein the register array is a circular right shift register array comprising an array of registers that shift sequences of numbers.

23. The fast method according to claim 22 wherein the one-dimensional convolution of said applying step is performed via a Fast Fourier Transform (FFT) to each projection of the DPRT of the input image and to each projection of the DPRT of the filter.

24. The fast method according to claim 19 wherein the register array is a circular left shift register array comprising an array of registers that shift sequences of numbers.

25. The fast method according to claim 19 further comprising the steps of:
computing a DPRT of a filter;
applying one-dimensional convolution to each projection of the DPRT of the input image and to each projection of the DPRT of the filter to obtain convolved projections;
applying an inverse DPRT for each convolved projection; and
reconstructing a final image.

26. The fast method according to claim 25 wherein the one-dimensional convolution of said applying step is performed directly to each projection of the DPRT of the input image and to each projection of the DPRT of the filter.

27. A fast method for computing an inverse discrete periodic radon transform (DPRT) comprising the steps of:
(a) receiving an input, the input comprising a DPRT of an input image comprising image sample strips, each image sample strip consisting of a number of rows of pixels;
(b) determining one or more Pareto-optimal implementations of the inverse DPRT by selecting the one or more Pareto-optimal implementations that satisfy $$\min_H H \left\lceil \frac{N}{H} \right\rceil - N$$

subject to $$K = 1, 2, 3 \ldots \left\lceil \frac{N}{2} \right\rceil$$

where H denotes a number of rows of pixels of image sample strips, N is prime and represents a number of rows and a number of columns of the input image, and $$\left\lceil \frac{N}{H} \right\rceil = K,$$

represents a number of image sample strips;
(c) storing each image sample strip into a register array, the register array arranged as a row of registers with a width the same as the input and a bit depth the same as a bit depth of a selected pixel of the input;
(d) shifting the row of registers of each image sample strip by the number of rows of the input image in a single clock cycle using the register array;
(e) computing summations along columns of the input image using a pipelined adder tree that produces outputs every clock cycle;
(f) outputting by the adder tree the outputs, the outputs comprising a plurality of partial inverse DPRT projections;
(g) performing steps (e) and (f) for all projections of the plurality except for the last projection;
(h) summing any row of the input to obtain a sum;
(i) subtracting the sum from the last partial inverse DPRT of each strip to obtain a value; and
(j) dividing the value by a total number of rows of the input to normalize the output.

28. The method according to claim 27 wherein the register array is a circular right shift register array comprising an array of registers that shift sequences of numbers.

29. The method according to claim 27 wherein the register array is a circular left shift register array comprising an array of registers that shift sequences of numbers.

30. The method according to claim 27 wherein said dividing step further comprises the step of using a custom pipelined divider.

* * * * *